United States Patent
Cheng et al.

(10) Patent No.: US 10,642,398 B2
(45) Date of Patent: May 5, 2020

(54) DRIVER APPARATUS

(71) Applicant: E Ink Holdings Inc., Hsinchu (TW)

(72) Inventors: Hsiao-Lung Cheng, Taoyuan (TW); Chi-Mao Hung, Taoyuan (TW)

(73) Assignee: E Ink Holdings Inc., Hsinchu (TW)

( * ) Notice: Subject to any disclaimer, the term of this patent is extended or adjusted under 35 U.S.C. 154(b) by 0 days.

(21) Appl. No.: 16/368,873

(22) Filed: Mar. 29, 2019

(65) Prior Publication Data

US 2019/0354217 A1    Nov. 21, 2019

(30) Foreign Application Priority Data

May 15, 2018    (TW) .............. 107116393 A

(51) Int. Cl.
*G06F 3/041* (2006.01)
*G06F 3/045* (2006.01)
*G09G 3/34* (2006.01)

(52) U.S. Cl.
CPC ............ *G06F 3/0412* (2013.01); *G06F 3/045* (2013.01); *G06F 3/0418* (2013.01); *G06F 3/04186* (2019.05); *G09G 3/3433* (2013.01); *G06F 2203/04107* (2013.01)

(58) Field of Classification Search
CPC .............. G06F 3/044; G06F 3/0412; G06F 2203/04111; G06F 3/03545; G06F 3/045; G09G 3/34
See application file for complete search history.

(56) References Cited

U.S. PATENT DOCUMENTS

| | | | |
|---|---|---|---|
| 6,057,903 A | 5/2000 | Colgan et al. | |
| 6,177,918 B1 | 1/2001 | Colgan et al. | |
| 8,743,300 B2 | 6/2014 | Chang et al. | |
| 8,804,056 B2 | 8/2014 | Chang et al. | |
| 9,025,090 B2 | 5/2015 | Chang et al. | |
| 9,146,414 B2 | 9/2015 | Chang et al. | |
| 9,164,641 B1 | 10/2015 | Rowe | |
| 2010/0289769 A1* | 11/2010 | Watanabe | G06F 3/0418 345/174 |
| 2013/0293513 A1 | 11/2013 | Hotelling et al. | |

(Continued)

FOREIGN PATENT DOCUMENTS

WO    2016075589    5/2016

*Primary Examiner* — Kent W Chang
(74) *Attorney, Agent, or Firm* — JCIPRNET

(57) ABSTRACT

A driver apparatus configured to drive an electronic paper display panel to perform a touch sensing operation is provided. The driver apparatus includes a scanner apparatus and a sensing apparatus. The scanner apparatus scans multiple sensing blocks of the electronic paper display panel to perform the touch sensing operation. Each sensing block includes one or more sensing devices. The sensing blocks are arranged in an array. The sensing apparatus is electrically connected to the scanner apparatus. The sensing apparatus controls the scanner apparatus to scan the sensing blocks. The sensing apparatus charges/discharges each sensing block according to a first voltage and a second voltage, so that a relaxation signal is generated. A pulse difference of the relaxation signal is changed by the touch object. The touch object is a conductor. A touch position of the touch object on the electronic paper display panel is determined according to a relaxation frequency of the relaxation signal of each sensing block.

16 Claims, 13 Drawing Sheets

(56) References Cited

U.S. PATENT DOCUMENTS

| | | | |
|---|---|---|---|
| 2013/0314369 A1* | 11/2013 | Liu | G06F 3/0412 |
| | | | 345/174 |
| 2013/0333023 A1 | 12/2013 | Park et al. | |
| 2014/0088393 A1* | 3/2014 | Bernstein | G06F 19/3456 |
| | | | 600/365 |
| 2014/0092044 A1 | 4/2014 | Kim et al. | |
| 2014/0122648 A1 | 5/2014 | Kang et al. | |
| 2014/0139484 A1 | 5/2014 | Hotelling et al. | |
| 2014/0247247 A1 | 9/2014 | Hotelling et al. | |
| 2015/0309623 A1 | 10/2015 | Hotelling et al. | |
| 2017/0269773 A1 | 9/2017 | Suzuki | |
| 2017/0277931 A1* | 9/2017 | Uehara | G02F 1/1368 |
| 2018/0018051 A1* | 1/2018 | Ogura | G06F 3/041 |

* cited by examiner

DRIVER APPARATUS

CROSS-REFERENCE TO RELATED APPLICATION

This application claims the priority benefit of Taiwan application serial no. 107116393, filed on May 15, 2018. The entirety of the above-mentioned patent application is hereby incorporated by reference herein and made a part of this specification.

BACKGROUND OF THE INVENTION

Field of the Invention

The invention relates to a driver apparatus, and particularly relates to a driver apparatus configured to drive an electronic paper display panel to perform a touch sensing operation.

Description of Related Art

In recent years, since an electronic paper display apparatus has advantages of light and slim, durable, low power consumption that meets the requirement of energy saving and environmental protection, etc., it is widely applied to electronic readers (for example, electronic books, electronic newspapers) or other electronic devices (for example, electronic tags). On the other hand, if the electronic paper display apparatus may have a touch sensing function, it may provide an intuitive input method to the user to improve user's experience.

Generally, a touch sensor has to be exposed to air, and an internal layered structure thereof should not include, for example, an Indium Tin Oxide (ITO) conductive thin film or other similar conductive layer, so as to avoid covering other layered structures to cause a shielding effect and result in a fact that the touch sensor cannot implement a touch sensing operation. However, a panel of the electronic paper display apparatus generally includes the ITO conductive thin film or other similar conductive layer. When the touch sensor is integrated with the panel of the electronic paper display apparatus, the touch sensor is liable to unable to implement the touch sensing operation.

SUMMARY OF THE INVENTION

The invention is directed to a driver apparatus configured to drive an electronic paper display panel to provide a touch sensing operation.

The invention provides a driver apparatus configured to drive an electronic paper display panel to perform a touch sensing operation. The driver apparatus includes a scanner apparatus and a sensing apparatus. The scanner apparatus scans a plurality of sensing blocks of the electronic paper display panel to perform the touch sensing operation. Each of the sensing blocks includes one or a plurality of sensing devices. The sensing blocks are arranged in an array. The sensing apparatus is electrically connected to the scanner apparatus. The sensing apparatus controls the scanner apparatus to scan the sensing blocks. The sensing apparatus charges/discharges each of the sensing blocks according to a first voltage and a second voltage, so as to generate a relaxation signal. A pulse difference of the relaxation signal is changed by a touch object. The touch object is a conductor. A touch position of the touch object on the electronic paper display panel is determined according to a relaxation frequency of the relaxation signal of each of the sensing blocks.

In an embodiment of the invention, the sensing apparatus includes a plurality of sensing circuits. The sensing circuits respectively charge/discharge the sensing blocks of different columns to generate the relaxation signal.

In an embodiment of the invention, one of the sensing circuits is configured to output a control signal to control the scanner apparatus to scan the sensing blocks.

In an embodiment of the invention, one of the sensing circuits is configured to output a synchronization signal to synchronize the other sensing circuits, so as to respectively charge/discharge the sensing blocks of different columns during a sensing period to generate the relaxation signal.

In an embodiment of the invention, each of the sensing circuits includes a resistor device and an amplifier circuit. The resistor device has a first terminal and a second terminal. The second terminal of the resistor device is coupled to the sensing blocks. The amplifier circuit has a first input terminal, a second input terminal and an output terminal. The first input terminal of the amplifier circuit receives a reference voltage. The second input terminal of the amplifier circuit is coupled to the second terminal of the resistor device and the sensing blocks. The output terminal of the amplifier circuit is coupled to the first terminal of the resistor device. The reference voltage is switched between the first voltage and the second voltage.

In an embodiment of the invention, each of the sensing circuits includes a resistor device, a latch circuit, a first comparator circuit and a second comparator circuit. The resistor device has a first terminal and a second terminal. The second terminal of the resistor device is coupled to the sensing blocks. The latch circuit has a first input terminal, a second input terminal, and an output terminal. The output terminal of the latch circuit is coupled to the first terminal of the resistor device. The first comparator circuit has a first input terminal, a second input terminal and an output terminal. The first input terminal of the first comparator circuit is coupled to the second terminal of the resistor device and the sensing blocks. The second input terminal of the first comparator circuit receives the first voltage. The output terminal of the first comparator circuit is coupled to the first input terminal of the latch circuit. The second comparator circuit has a first input terminal, a second input terminal and an output terminal. The first input terminal of the second comparator circuit receives the second voltage. The second input terminal of the second comparator circuit is coupled to the second terminal of the resistor device and the sensing blocks. The output terminal of the second comparator circuit is coupled to the second input terminal of the latch circuit.

In an embodiment of the invention, each of the sensing circuits is a microcontroller unit (MCU).

In an embodiment of the invention, the scanner apparatus sequentially scans the sensing blocks of different rows on the electronic paper display panel based on rows.

In an embodiment of the invention, the scanner apparatus includes a plurality of scan circuits. The scan circuits are respectively and electrically connected to the sensing blocks of different rows. The scan circuits are configured to turn on the respectively connected sensing blocks during a sensing period, so as to perform the touch sensing operation.

In an embodiment of the invention, the touch position of the touch object on the electronic paper display panel includes a first orientation and a second orientation. The first orientation is determined according to positions of a plurality of sensing circuits in the sensing apparatus. The second orientation is determined according to positions of a plurality of scan circuits in the scanner apparatus.

In an embodiment of the invention, the scanner apparatus and the sensing apparatus are integrated in an integrated chip.

In an embodiment of the invention, the integrated chip includes a touch driving block and a display driving block. The touch driving block is configured to drive the electronic paper display panel to perform the touch sensing operation. The scanner apparatus and the sensing apparatus are disposed in the touch driving block. The display driving block is electrically connected to the touch driving block. The display driving block is configured to drive the electronic paper display panel to perform an image display operation.

In an embodiment of the invention, the touch driving block includes a voltage generation circuit. The voltage generation circuit is electrically connected to the sensing apparatus. The voltage generation circuit is configured to generate the first voltage and the second voltage.

In an embodiment of the invention, the electronic paper display panel includes a plurality of pixel units. The pixel units are operated in a display mode or a sensing mode. The touch driving block includes a pixel control circuit. The pixel control circuit is electrically connected to the sensing apparatus. In the display mode, the pixel control circuit controls to turn on a transistor in each of the pixel units. In the sensing mode, the pixel control circuit controls not to turn on the transistor in each of the pixel units.

In an embodiment of the invention, the electronic paper display panel is one of a segmented electronic paper display panel and a thin film transistor electronic paper display panel.

In an embodiment of the invention, the electronic paper display panel includes a conductive shielding layer.

According to the above description, in the embodiments of the invention, the driver apparatus is configured to drive the electronic paper display panel to provide the touch sensing function. The touch position of the touch object on the electronic paper display panel is determined according to the relaxation frequency of the relaxation signal of each of the sensing blocks. By using the driver apparatus of the invention to drive the electronic paper display panel, good sensing quality is achieved.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

A plurality of embodiments is provided below to describe the invention, though the invention is not limited to the provided embodiments, and the provided embodiments may be suitably combined. A term "couple" used in the full text of the disclosure (including the claims) refers to any direct and indirect connections. For example, if a first device is described to be coupled to a second device, it is interpreted as that the first device is directly coupled to the second device, or the first device is indirectly coupled to the second device through other devices or connection means. Moreover, a term "signal" refers to at least a current, a voltage, a charge, a temperature, data, an electromagnetic wave or any other one or more signals.

Figure 1:
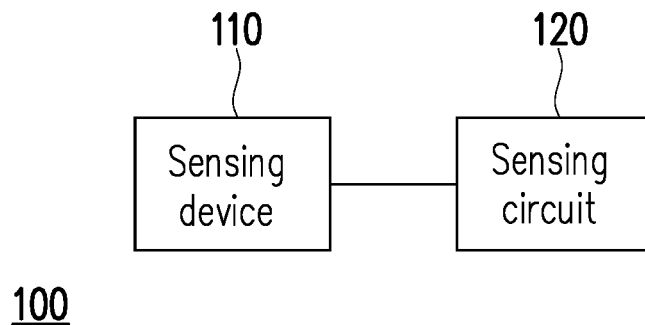
FIG. 1 is a schematic diagram of a touch sensor according to an embodiment of the invention.
Figure 2:
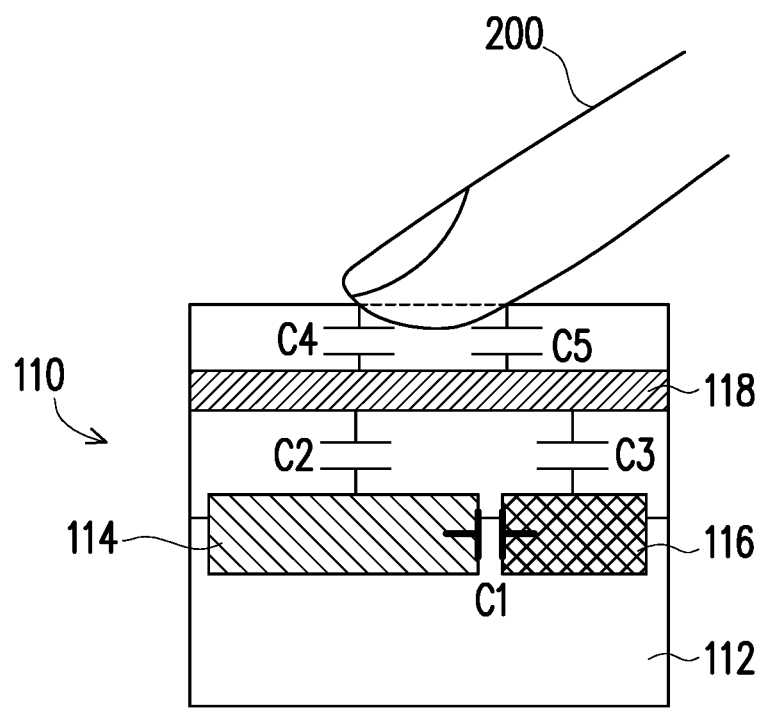
FIG. 2 is a structural schematic diagram of a sensing device of the embodiment of FIG. 1.
Figure 3:
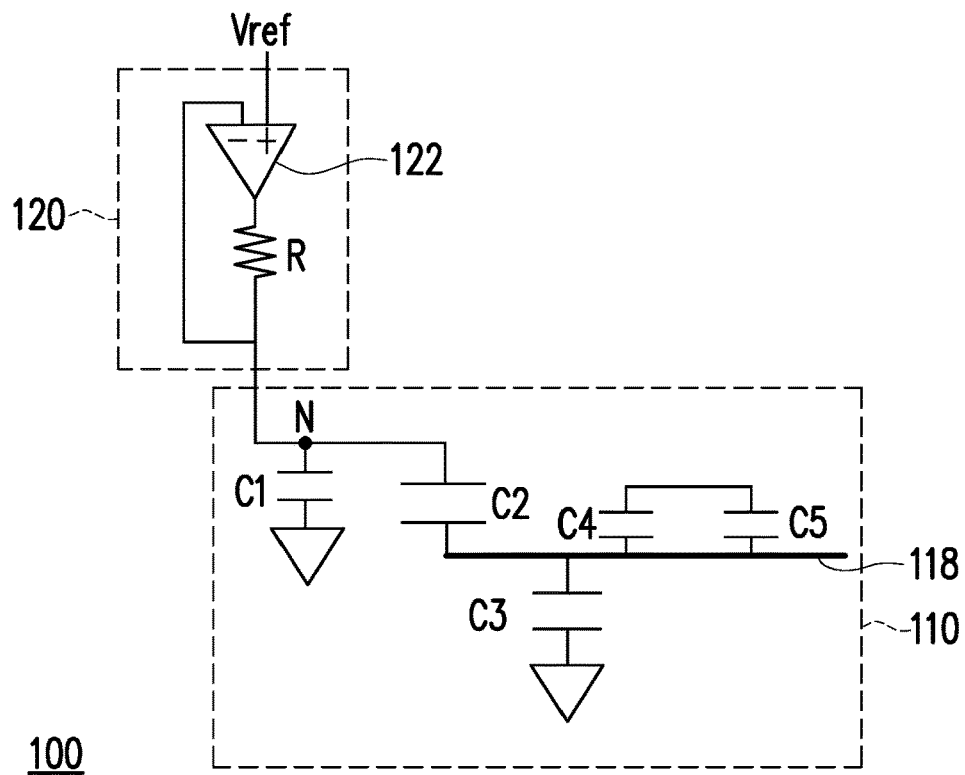
FIG. 3 and FIG. 4 are respectively equivalent circuit schematic diagrams of the touch sensor of the embodiment of FIG. 1 in different operation frequencies.
Figure 4:
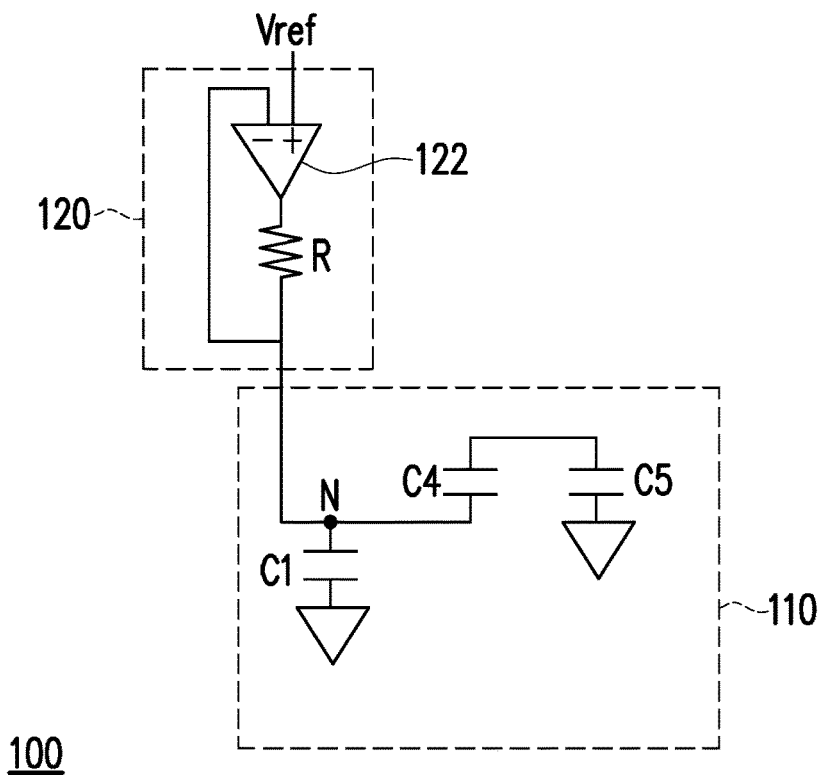

FIG. 1 is a schematic diagram of a touch sensor according to an embodiment of the invention. FIG. 2 is a structural schematic diagram of a sensing device of the embodiment of FIG. 1. FIG. 3 and FIG. 4 are respectively equivalent circuit schematic diagrams of the touch sensor of the embodiment of FIG. 1 in different operation frequencies. Referring to FIG. 1 to FIG. 4, the touch sensor 100 of the embodiment is used for sensing a touch object 200. The touch object 200 is a conductor, for example, user's finger or a touch control device. In the embodiment, the touch sensor 100 includes a sensing device 110 and a sensing circuit 120. The sensing circuit 120 is electrically connected to the sensing device 110. The sensing circuit 120 is used for charging/discharging the sensing device 110 to generate a relaxation signal, and a relaxation frequency thereof is an operation frequency of the touch sensor 100. In the embodiment, a pulse difference of the relaxation signal of the touch sensor 100 is changed by the touch object 200. When the touch object 200 touches the sensing device 110, the pulse difference of the relaxation signal is accordingly changed. Therefore, whether the touch object 200 touches the touch sensor 100 may be determined according to a magnitude of the pulse difference of the relaxation signal.

To be specific, in the embodiment, the sensing device 100 includes a substrate 112, a sensing electrode 114, a sensing common electrode 116 and a shielding layer 118. The sensing electrode 114 and the sensing common electrode 116 are disposed on the substrate 112. The sensing electrode 114 and the sensing common electrode 116 form a first capacitor device C1. In the embodiment, the sensing electrode 114 is used for transmitting a sensing signal, and the sensing common electrode 116 is, for example, coupled to a ground voltage, and is used for providing a reference voltage for a touch sensing operation. In an embodiment, the sensing common electrode 116 may also be coupled to a predetermined common electrode signal, or kept in a floating state, which is not limited by the invention. In the embodiment, the shielding layer 118 is disposed on the sensing electrode 114 and the sensing common electrode 116. The shielding layer 118 and the sensing electrode 114 form a second capacitor device C2. The shielding layer 118 and the sensing common electrode 116 form a third capacitor device C3. In the embodiment, the shielding layer 118 is a transparent conductive thin film, for example, an Indium Tin Oxide (ITO) conductive thin film, or other similar conductive layer. In an embodiment, the shielding layer 118, for example, includes a nano silver wire layer. The material and the type of the shielding layer 118 are not limited by the invention. In the embodiment, the touch object 200 contacts the sensing device 110 to respectively form a fourth capacitor device C4 and a fifth capacitor device C5 with the shielding layer 118. In the embodiment, a capacitance of each of the capacitance devices is, for example, determined according to a material characteristic of each of the layers.

In the embodiment, the sensing circuit 120 includes an amplifier circuit 122 and a resistor device R. The amplifier circuit 122 has a first input terminal (a non-inverting terminal), a second input terminal (an inverting terminal) and an output terminal. The first input terminal receives a reference voltage Vref. The output terminal is coupled to one terminal of the resistor device R. The second input terminal is coupled to another terminal of the resistor device R and a terminal N of the first capacitor device C1. In the embodiment, the sensing circuit 120, for example, includes a relaxation oscillator, and a framework thereof is schematically described, and the sensing circuit 120 may be implemented by the framework of any sensing circuit of the field, which is not limited by the invention. Enough instructions and recommendations for the detailed framework and implementation method thereof may be learned from ordinary knowledge of the art, and details thereof are not repeated.

Figure 5:
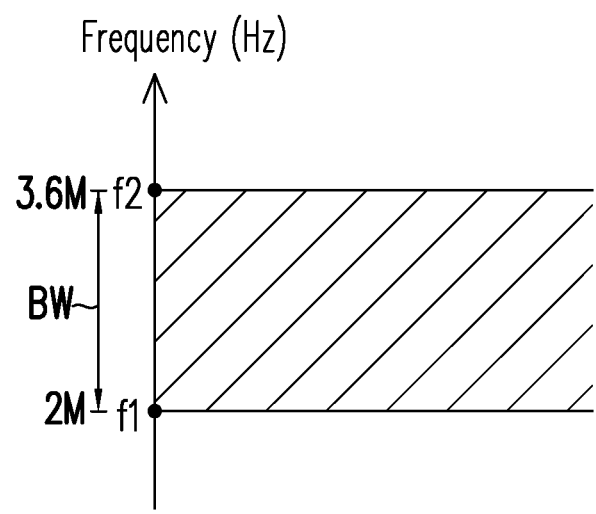
FIG. 5 is a schematic diagram of an operation frequency interval of the touch sensor of FIG. 1 implementing a touch sensing operation.
Figure 6:
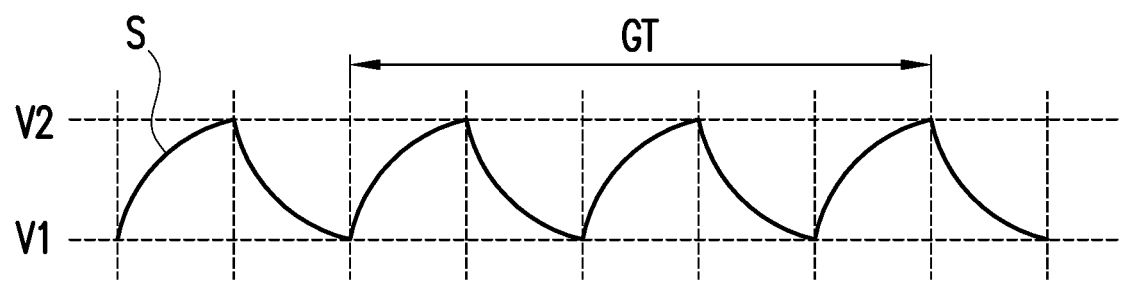
FIG. 6 is a waveform diagram of a relaxation signal according to an embodiment of the invention.
Figure 7:
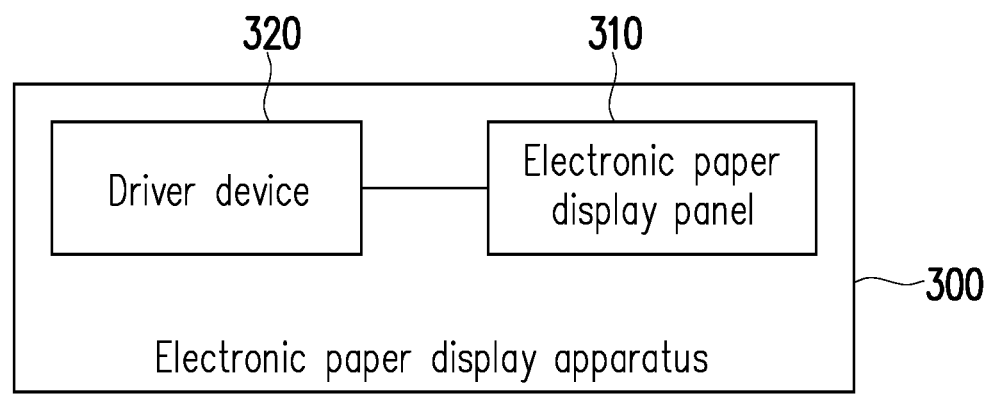
FIG. 7 is a schematic diagram of an electronic paper display apparatus according to an embodiment of the invention.

FIG. 5 is a schematic diagram of an operation frequency interval of the touch sensor of FIG. 1 implementing a touch sensing operation. FIG. 6 is a waveform diagram of a relaxation signal according to an embodiment of the invention. Referring to FIG. 3 to FIG. 6, the touch sensor 100 of the embodiment is, for example, operated in an operation frequency interval BW between a first frequency f1 and a second frequency f2, where the second frequency f2 is greater than the first frequency f1. For example, in the embodiment, the operation frequency interval BW is between 2 MHz and 3.6 MHz, though the invention is not limited thereto. In an embodiment, the operation frequency is substantially greater than 780 KHz. In the embodiment, the touch sensor 100 is, for example, applied to an electronic paper display apparatus, as shown in FIG. 7, to perform touch sensing. In an application that the electronic paper display apparatus is a segmented electronic paper display apparatus, an operation frequency thereof is substantially greater than 750 KHz, and the relaxation frequency of the relaxation signal of each touch sensor 100 is determined according to a resistance of the resistor device R. In an application that the electronic paper display apparatus is a thin film transistor electronic paper display apparatus, the operation frequency interval BW is, for example, between 2 MHz and 3.6 MHz, and the relaxation frequency of the relaxation signal of each touch sensor 100 is determined according to the resistance of the resistor device R and a parasitic resistance of the sensing device 110. In an embodiment, the relaxation frequency may be determined according to a parasitic resistance and a parasitic capacitance of a pixel unit, a first voltage, a second voltage, and a parasitic resistance of a tracing of a transistor circuit.

FIG. 3 is an equivalent circuit schematic diagram of the touch sensor 100 operated in any frequency outside the operation frequency interval BW. In FIG. 3, in case of any frequency outside the operation frequency interval BW, the fourth capacitor device C4 and the fifth capacitor device C5 are shielded. FIG. 4 is an equivalent circuit schematic diagram of the touch sensor 100 operated in any frequency within the operation frequency interval BW. In FIG. 4, when the touch sensor 100 is operated in any frequency within the operation frequency interval BW, the second capacitor device C2 and the third capacitor device C3 present a short-circuit state.

In FIG. 4, when the touch object 200 does not touch the touch sensor 100, the fourth capacitor device C4 and the fifth capacitor device C5 do not exist. In this case, the reference voltage Vref is, for example, set to the second voltage V2, and the amplifier circuit 122 charges the terminal N of the first capacitor device C1 through the resistor device R, and a signal waveform of the relaxation signal S is increased toward the second voltage V2. When a voltage of the terminal N is equal to the second voltage V2, the reference voltage Vref is, for example, switched to the first voltage V1, and the amplifier circuit 122 discharges the terminal N of the first capacitor device C1 through the resistor device R, and the signal waveform of the relaxation signal S is decreased toward the first voltage V1. Repeatedly, the reference voltage Vref is switched between the first voltage V1 and the second voltage V2, and charges/discharges the terminal N of the first capacitor device C1 to generate the relaxation signal S. The relaxation signal S is oscillated between the first voltage V1 and the second voltage V2, and in the embodiment of the segmented electronic paper display apparatus, the relaxation frequency of the relaxation signal S is determined according to the resistance of the resistor device R. In the embodiment of the thin film transistor electronic paper display apparatus, the relaxation frequency of the relaxation signal S is determined according to the resistance of the resistor device R and the parasitic resistance of the sensing device 110. In an embodiment, the relaxation frequency may be determined according to a parasitic resistance and a parasitic capacitance of a pixel unit, the first voltage, the second voltage, and a parasitic resistance of a tracing of a transistor circuit.

In FIG. 4, when the touch object 200 touches the touch sensor 100, the fourth capacitor device C4 and the fifth capacitor device C5 exist. Now, since an equivalent capacitance between the terminal N and the terminal ground has been changed, the relaxation frequency is changed, for example, decreased in response to the touch object 200. In a sensing period GT, a pulse number of the relaxation signal S is decreased. Therefore, in the embodiment, one of the methods for determining a change of the relaxation frequency is to determine whether the pulse number of the relaxation signal S is changed during the sensing period GT. In other words, in the embodiment, a pulse difference of the relaxation signal S is changed by the touch object (for example, a touched conductor). Whether the touch object 200 touches the touch sensor may be determined according to the pulse difference of the relaxation signal S.

In the embodiment, one of the methods for determining whether the pulse number of the relaxation signal S is changed during the sensing period GT is, for example, to transmit the relaxation signal S to a counter circuit (not shown) or other similar circuit. For example, the counter circuit is, for example, electrically connected to an output of the amplifier circuit 122 to receive the relaxation signal S, and counts the pulse number of the relaxation signal S during the sensing period GT. The counter circuit is, for example, an external circuit independent to the sensing circuit 120, or a counter circuit configured in the sensing circuit 120. In the embodiment, the counter circuit may be implemented by a framework of any type of the counter circuit of the technical field, which is not limited by the invention. Enough instructions and recommendations for the detailed framework and implementation method thereof may be learned from ordinary knowledge of the art, and details thereof are not repeated.

In the embodiment, whether the touch object 200 touches the touch sensor 100 may be determined according to the pulse difference of the relaxation signal S. In an application of a plurality of touch sensors, for example, the touch sensors are arranged on a substrate in an array to construct a touch sensing panel. A touch position of the touch object 200 on the touch sensing panel is determined by whether the pulse difference of the relaxation signal S of each of the touch sensors is changed.

Figure 8:
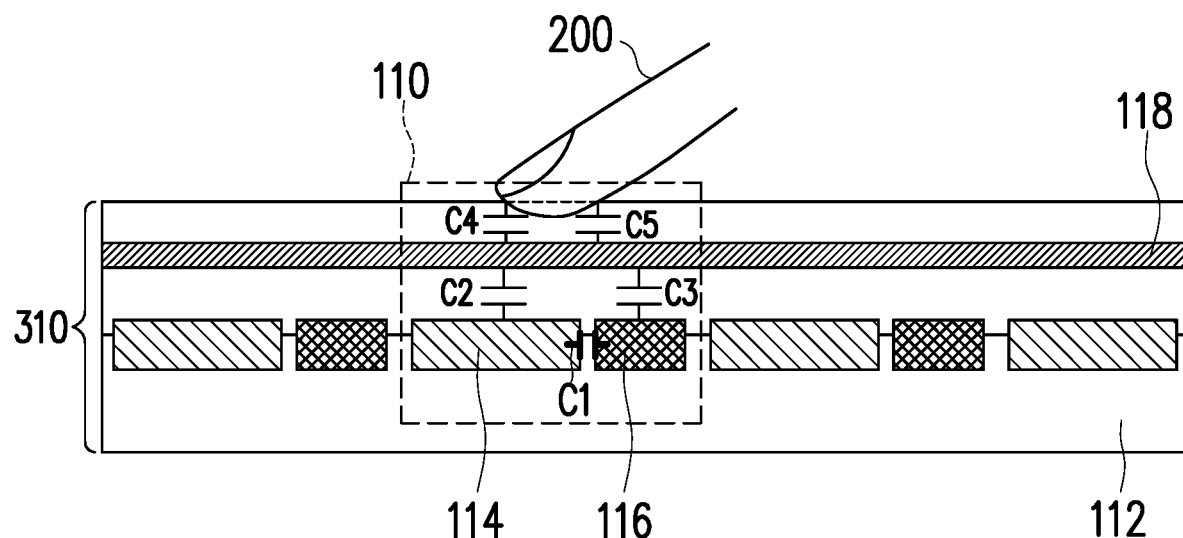
FIG. 8 is a structural schematic diagram of an electronic paper display panel of the embodiment of FIG. 7.

FIG. 7 is a schematic diagram of an electronic paper display apparatus according to an embodiment of the invention. FIG. 8 is a structural schematic diagram of an electronic paper display panel of the embodiment of FIG. 7. Referring to FIG. 7 and FIG. 8, the electronic paper display apparatus 300 of the embodiment has a touch sensing function. The electronic paper display apparatus 300 includes an electronic paper display panel 310 and a driver apparatus 320. The driver apparatus 320 is electrically connected to the electronic paper display panel 310. The driver apparatus 320 is used for driving the electronic paper display panel 310 to display an image frame, and perform a touch sensing operation.

To be specific, in the embodiment, the electronic paper display panel 310 includes a plurality of the touch sensors 100 shown in FIG. 1. In FIG. 8, the electronic paper display panel 310 includes a plurality of sensing devices 110. The sensing circuit 120 may be disposed in the driver apparatus 320, or integrated with the electronic paper display panel 310, or disposed in other external circuit. The configuration position of the sensing circuit 120 is not limited by the invention. In the embodiment, the relaxation frequency of the relaxation signal of each of the touch sensors 110 is determined by the resistance of the resistor device R in the sensing circuit 120 and/or the parasitic resistance in the sensing device 110. When the touch object 200 touches the electronic paper display panel 310, the pulse difference of the relaxation signal is changed by the touch object 200. Therefore, a touch position of the touch object 200 on the electronic paper display panel 310 is determined according to the pulse difference of the relaxation signal of each of the touch sensors 100. In an embodiment, the relaxation frequency may also be determined according to a parasitic resistance and a parasitic capacitance of a pixel unit, a first voltage, a second voltage, and a parasitic resistance of a tracing of a transistor circuit. Moreover, enough instructions, recommendations and implementations for the touch sensing operation of the embodiment may be learned from related descriptions of the embodiments of FIG. 1 to FIG. 6, and details thereof are not repeated.

In the embodiment, the electronic paper display apparatus 300 is, for example, a segmented electronic paper display apparatus or a thin film transistor electronic paper display apparatus, though the invention is not limited thereto. In an embodiment, a design of the driver apparatus 320 is adjusted to be adapted to the electronic paper display apparatus 300, and the driver apparatus 320 may be implemented by a suitable circuit framework of the technical field, which is not limited by the invention.

In the embodiment, the electronic paper display panel 310 includes the shielding layer 118. The shielding layer 118 includes an indium tin oxide conductive film, or a nano silver wire layer or other similar conductive layer, though the invention is not limited thereto. In the embodiment, the electronic paper display apparatus 300 determines the touch position of the touch object 200 on the electronic paper display panel 310 according to the pulse difference of the relaxation signal of each of the touch sensors 100. Existence of the shielding layer 118 does not influence the touch sensing operation of the electronic paper display apparatus 300.

Figure 9:
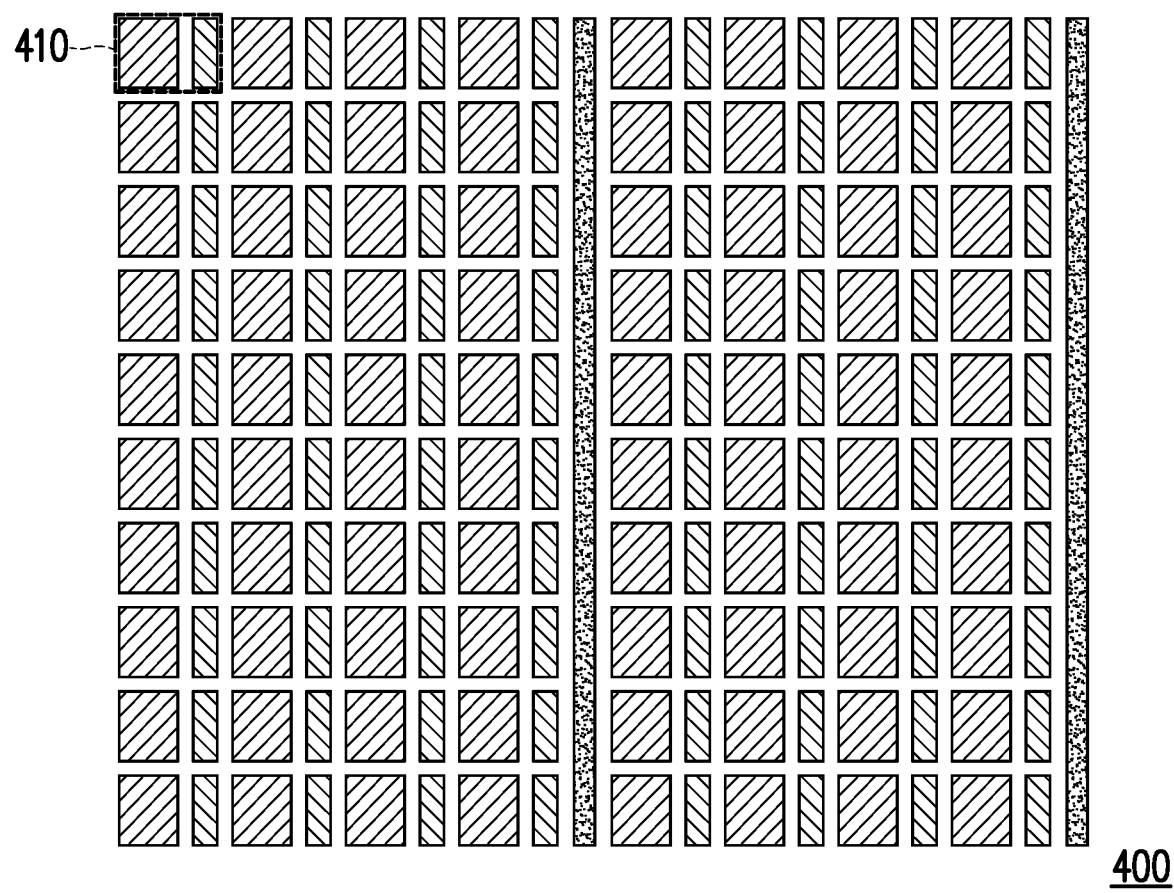
FIG. 9 is a structural schematic diagram of an electronic paper display panel according to an embodiment of the invention.
Figure 10:
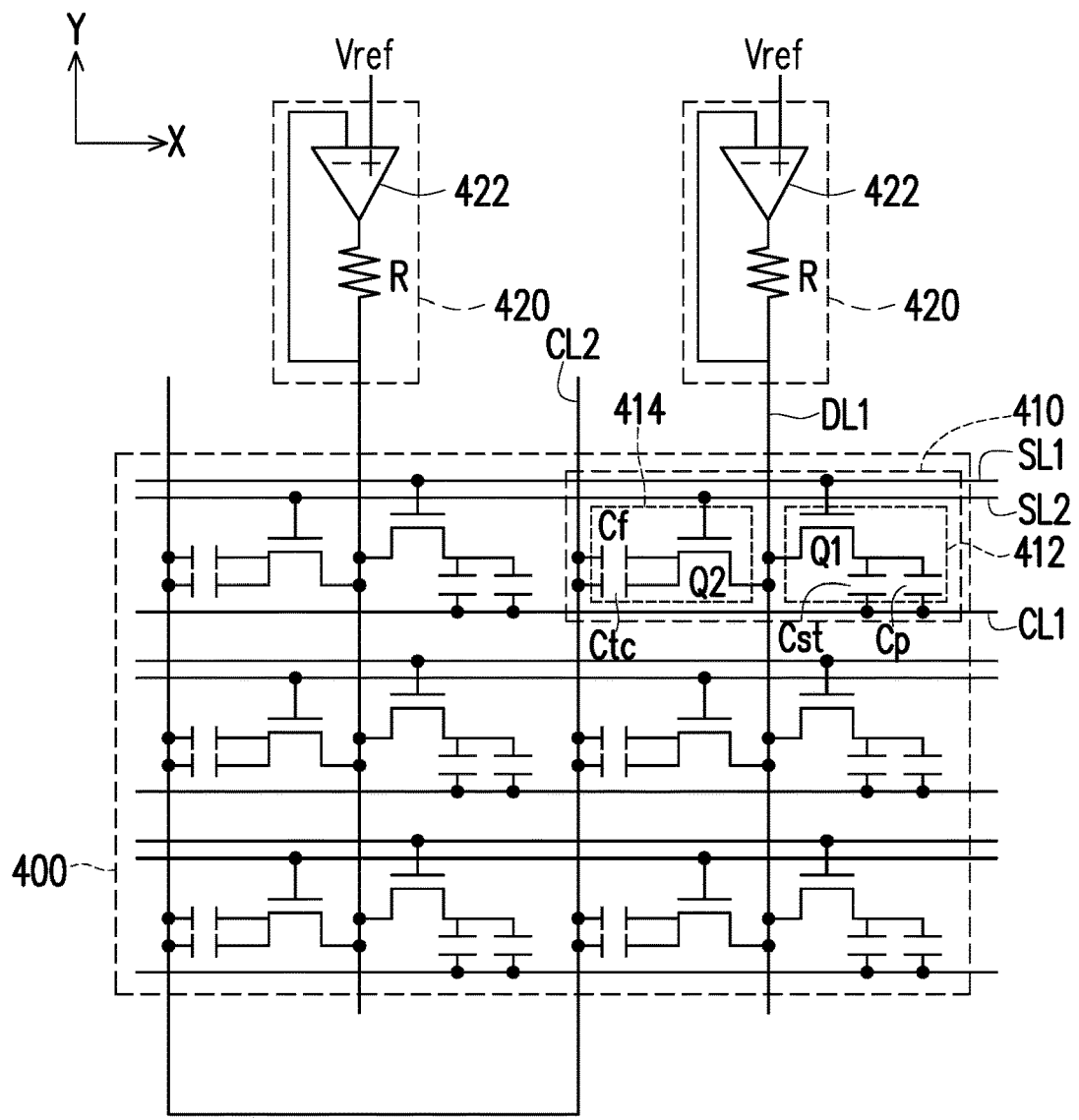
FIG. 10 is a circuit schematic diagram of the electronic paper display panel of the embodiment of FIG. 9.

FIG. 9 is a structural schematic diagram of an electronic paper display panel according to an embodiment of the invention. FIG. 10 is a circuit schematic diagram of the electronic paper display panel of the embodiment of FIG. 9. Referring to FIG. 9 and FIG. 10, the electronic paper display panel 400 of the embodiment includes a plurality of first scan lines SL1, a plurality of second scan lines SL2, a plurality of data lines DL1, a plurality of first common electrode lines CL1, a plurality of second common electrode lines CL2 and a plurality of pixel units 410.

In the embodiment, the pixel units 410 are arranged in an array, and are electrically connected to one or a plurality of sensing circuits 420 through the data lines DL1. In the embodiment, the sensing circuits 420 may be integrated on the electronic paper display panel 310, or disposed in other external circuit. The pixel units 410 are used for sensing the touch object 200 of FIG. 2 or FIG. 8. In the embodiment, the pixel units 410 in a same column are connected to the same sensing circuit 420. In an embodiment, the pixel units in different columns may also be connected to a same sensing circuit. Alternatively, in an embodiment, the pixel unit may also be properly grouped, and the pixel units of the same group share a same sensing circuit. The number of the sensing circuits 420 is not limited by the invention.

In the embodiment, the pixel unit 410 includes a first transistor circuit 412 and a second transistor circuit 414. The first transistor circuit 412 includes a first transistor Q1, a pixel capacitor device Cp and a storage capacitor device Cst. The second transistor circuit 414 includes a second transistor Q2, a touch capacitor device Ctc and a sensing capacitor device Cf. In the embodiment, the touch capacitor device Ctc includes the first capacitor device C1, the second capacitor device C2 and the third capacitor device C3 of FIG. 2. For example, the touch capacitor device Ctc is, for example, one of the first capacitor device C1, the second capacitor device C2 and the third capacitor device C3, or an equivalent capacitor device of a combination of the above three capacitor devices connected in series or parallel. In the embodiment, the sensing capacitor device Cf includes the fourth capacitor device C4 and the fifth capacitor device C5 of FIG. 2. For example, the sensing capacitor device Cf is, for example, one of the fourth capacitor device C4 and the fifth capacitor device C5, or an equivalent capacitor device of a combination of the above two capacitor devices connected in series or parallel.

In the embodiment, a first terminal of the first transistor Q1 is electrically connected to the data line DL1. A second terminal of the first transistor Q1 is electrically connected to a first terminal of the pixel capacitor device Cp and a first terminal of the storage capacitor device Cst. A control terminal of the first transistor Q1 is electrically connected to the first scan line SL1. A first terminal of the pixel capacitor device Cp is electrically connected to the second terminal of the first transistor Q1. A second terminal of the pixel capacitor device Cp is electrically connected to the first common electrode line CL1. A first terminal of the storage capacitor device Cst is electrically connected to the second terminal of the first transistor Q1. A second terminal of the storage capacitor device Cst is electrically connected to the first common electrode line CL1. In the embodiment, the first scan line SL1 and the first common electrode line CL1 are respectively used for providing a first scan signal and a first common electrode signal to the first transistor Q1. In a display mode, the data line DL1 is used for providing a data signal to the first transistor Q1. The first scan signal is transmitted through the first scan line SL1, and turns on the first transistor Q1 in the display mode, such that the pixel unit 410 performs an image display operation to display image data according to the data signal and the first common electrode signal.

In the embodiment, a first terminal of the second transistor Q2 is electrically connected to the data line DL1. A second terminal of the second transistor Q2 is electrically connected to a first terminal of the touch capacitor device Ctc and a first terminal of the sensing capacitor device Cf. A control terminal of the second transistor Q2 is electrically connected to the second scan line SL2. A first terminal of the touch capacitor device Ctc is electrically connected to the second terminal of the second transistor Q2. A second terminal of the touch capacitor device Ctc is electrically connected to the second common electrode line CL2. A first terminal of the sensing capacitor device Cf is electrically connected to the second terminal of the second transistor Q2. A second terminal of the sensing capacitor device Cf is electrically connected to the second common electrode line CL2. In the embodiment, the second scan line SL2 and the second common electrode line CL2 are respectively used for providing a second scan signal and a second common electrode signal to the second transistor Q2. The second scan signal is transmitted through the second scan line SL2, and turns on the second transistor Q2 in a sensing mode, such that the pixel unit 410 performs a touch sensing operation to sense the touch object 200 according to the second common electrode signal. In the sensing mode, the second transistor Q2 is turned on, and the sensing circuit 420 charges/discharges the first terminal of the touch capacitor device Ctc through the data line DL1 to generate the relaxation signal S shown in FIG. 6. Moreover, enough instructions, recommendations and implementations for the method of generating the relaxation signal S of the embodiment may be learned from related descriptions of the embodiments of FIG. 1 to FIG. 6, and details thereof are not repeated.

In the embodiment, the first scan lines SL1, the second scan lines SL2 and the first common electrode lines CL1 are arranged in a first direction Y. The data lines DL1 and the second common electrode lines CL2 are arranged in a second direction X. The first direction Y and the second direction X are different, and are perpendicular to each other in FIG. 10.

Figure 11:
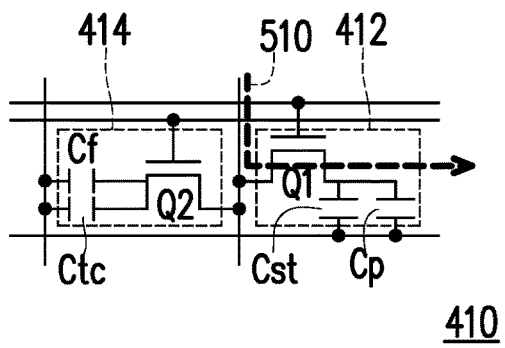
FIG. 11 and FIG. 12 are schematic diagrams of a pixel unit of the embodiment of FIG. 9 operated in different operation modes.
Figure 12:
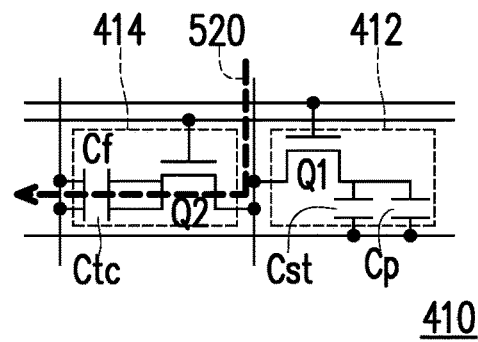

FIG. 11 and FIG. 12 are schematic diagrams of the pixel unit of the embodiment of FIG. 9 operated in different operation modes. Referring to FIG. 11 and FIG. 12, FIG. 11 illustrates a situation that the pixel unit 410 is operated in the display mode, and FIG. 12 illustrates a situation that the pixel unit 410 is operated in the sensing mode. In FIG. 11, when the pixel unit 410 is operated in the display mode, the first scan signal turns on the first transistor Q1, and the second scan signal does not turn on the second transistor Q2. The data signal is transmitted to the first transistor circuit 412 through a signal transmission path 510. The pixel unit 410 performs the image display operation to display image data according to the data signal and the first common electrode signal.

In FIG. 12, when the pixel unit 410 is operated in the sensing mode, the first scan signal does not turn on the first transistor Q1, and the second scan signal turns on the second transistor Q2. The sensing circuit 420 charges/discharges the first terminal of the touch capacitor device Ctc through the data line DL1 to generate the relaxation signal S of FIG. 6. The relaxation signal S is transmitted through a signal transmission path 520. In the embodiment, the relaxation frequency of the relaxation signal S of each of the pixel units 410 is determined according to the resistance of the resistor device R and/or the parasitic resistance therein. Moreover, the pulse difference of the relaxation signal is changed by the touch object 200. When the touch object 200 touches the pixel unit 410, the touch object 200 and the pixel unit 410 form the sensing capacitor device Cf. The touch position of the touch object 200 on the electronic paper display panel 400 may be determined according to the pulse difference of the relaxation signal of each of the pixel units 410. In an embodiment, the relaxation frequency may also be determined according to a parasitic resistance and a parasitic capacitance of the pixel unit, the first voltage, the second voltage, and a parasitic resistance of a tracing of the transistor circuit. Moreover, enough instructions, recommendations and implementations for the touch sensing operation of the embodiment may be learned from related descriptions of the embodiments of FIG. 1 to FIG. 6, and details thereof are not repeated.

In the embodiment of FIG. 10, the second transistor circuit 414 and the first transistor circuit 412 share the data line DL1 to transmit the relaxation signal S, though the invention is not limited thereto. In another embodiment, the second transistor circuit 414 may also adopt other signal line to transmit the relaxation signal S.

Figure 13:
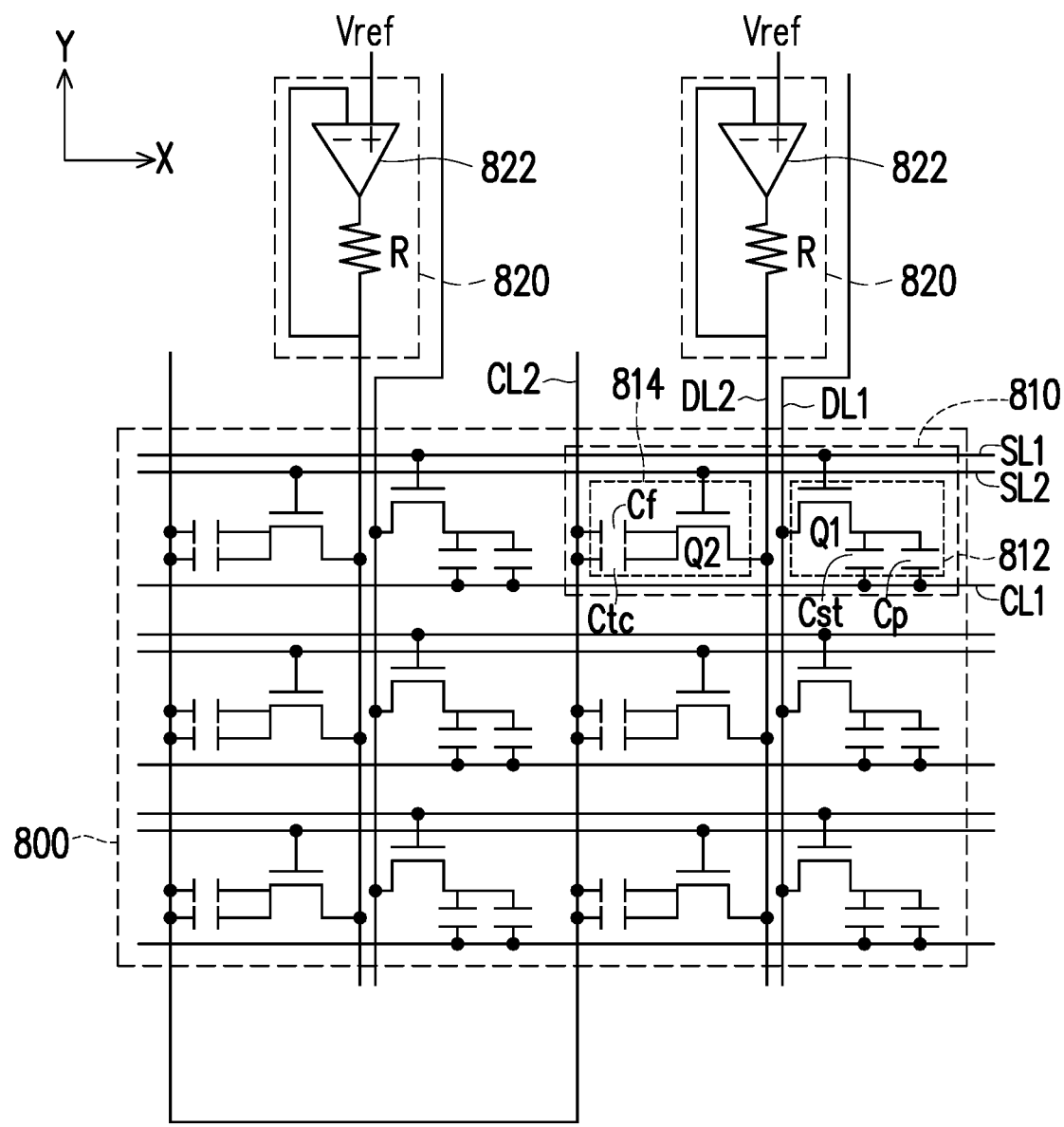
FIG. 13 is a circuit schematic diagram of an electronic paper display panel according to another embodiment of the invention.

FIG. 13 is a circuit schematic diagram of an electronic paper display panel according to another embodiment of the invention. Referring to FIG. 10 and FIG. 13, the electronic paper display panel 800 of the embodiment is similar to the electronic paper display panel 400 of the embodiment of FIG. 10, and a main difference there between is that the electronic paper display panel 800 further includes a plurality of sensing lines DL2, and the second transistor circuit 814 uses the sensing lines DL2 to transmit the relaxation signal S.

In detail, in the embodiment, the sensing line DL2 is electrically connected to the second transistor circuit 814. The second transistor circuit 814 is electrically connected to the sensing circuit 820 through the sensing line DL2. In the sensing mode, the second transistor Q2 is turned on, and the sensing circuit 820 charges/discharges the first terminal of the touch capacitor device Ctc through the sensing line DL2 to generate the relaxation signal S. Moreover, enough instructions, recommendations and implementations for the touch sensing operation of the embodiment may be learned from related descriptions of the embodiments of FIG. 1 to FIG. 12, and details thereof are not repeated.

Figure 14:
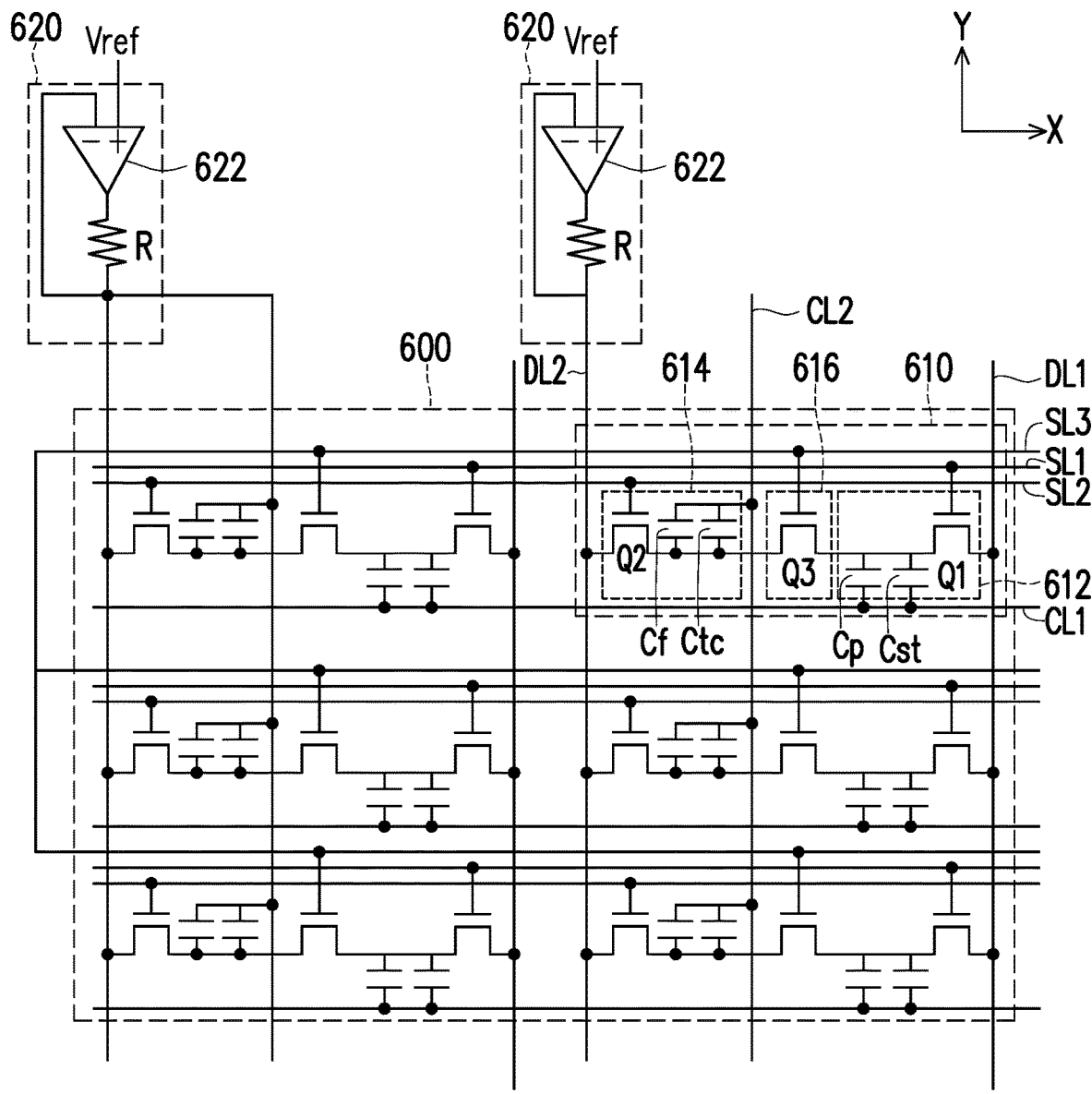
FIG. 14 is a circuit schematic diagram of an electronic paper display panel according to another embodiment of the invention.

FIG. 14 is a circuit schematic diagram of an electronic paper display panel according to another embodiment of the invention. Referring to FIG. 10 and FIG. 14, the electronic paper display panel 600 of the embodiment is similar to the electronic paper display panel 400 of the embodiment of FIG. 10, and a main difference there between is that the electronic paper display panel 600 further includes a plurality of third scan lines SL3 and a plurality of sensing lines DL2, and the pixel unit 610 further includes a third transistor circuit 616.

To be specific, in the embodiment, the third transistor circuit 616 is electrically connected between a first transistor circuit 612 and a second transistor circuit 614. The third transistor circuit 616 includes a third transistor Q3. A first terminal of the third transistor Q3 is electrically connected to the second terminal of the second transistor Q2. A second terminal of the third transistor Q3 is electrically connected to the second terminal of the first transistor Q1. A control terminal of the third transistor Q3 is electrically connected to the third scan line SL3. The first terminal of the second transistor Q2 is electrically connected to the sensing line DL2. In the embodiment, the third scan line SL3 and the first common electrode line CL1 are respectively used for providing a third scan signal and the first common electrode signal to the third transistor Q3. In the display mode, the data line DL1 is used for providing the data signal to the first transistor Q1 and the third transistor Q3. The first scan signal and the third scan signal are transmitted through the first scan line SL1 and the third scan line SL3, and turn on the first transistor Q1 and the third transistor Q3 in the display mode, and the second transistor Q2 is not turned on, such that the pixel unit 610 performs the image display operation to display image data according to the data signal and the first common electrode signal.

In the embodiment, the second scan line SL2 and the second common electrode line CL2 are respectively used for providing a second scan signal and a second common electrode signal to the second transistor Q2. The second scan signal is transmitted through the second scan line SL2, and turns on the second transistor Q2 in the sensing mode, and the third transistor Q3 is not turned on, such that the pixel unit 610 performs the touch sensing operation to sense the touch object 200 according to the second common electrode signal. In the sensing mode, the second transistor Q2 is turned on, and the sensing circuit 620 charges/discharges the first terminal of the touch capacitor device Ctc through the sensing line DL2 to generate the relaxation signal S of FIG. 6. Moreover, enough instructions, recommendations and implementations for the method of generating the relaxation signal S of the embodiment may be learned from related descriptions of the embodiments of FIG. 1 to FIG. 6, and details thereof are not repeated.

In the embodiment, the first scan line SL1, the second scan line SL2, the third scan line SL3 and the first common electrode line CL1 are arranged in the first direction Y. The data line DL1, the sensing line DL2 and the second common electrode line CL2 are arranged in the second direction X. The first direction Y and the second direction X are different to each other, and are perpendicular to each other in FIG. 14.

Figures 15, 16:
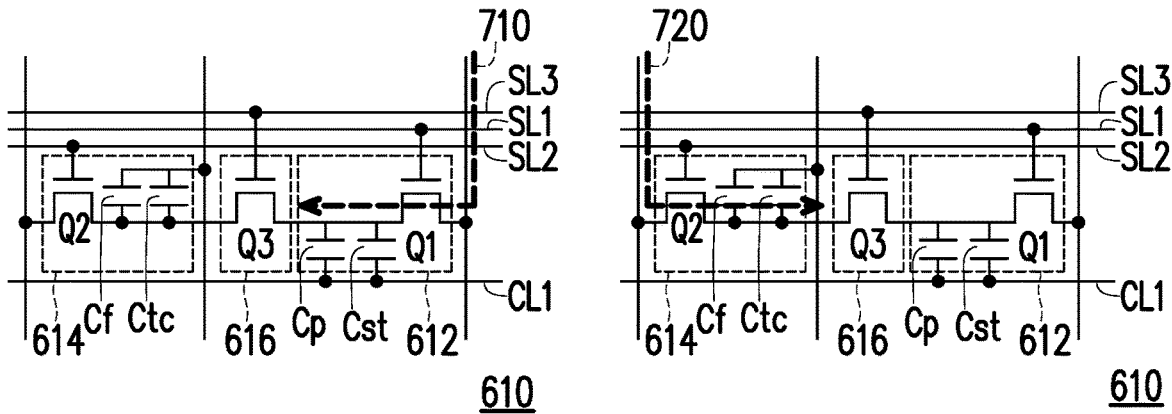
FIG. 15 and FIG. 16 are respectively schematic diagrams of a pixel unit of the embodiment of FIG. 14 operated in different operation modes.

FIG. 15 and FIG. 16 are respectively schematic diagrams of the pixel unit of the embodiment of FIG. 14 operated in different operation modes. Referring to FIG. 15 and FIG. 16, FIG. 15 illustrates a situation that the pixel unit 610 is operated in the display mode, and FIG. 16 illustrates a situation that the pixel unit 610 is operated in the sensing mode. In FIG. 15, when the pixel unit 610 is operated in the display mode, the first scan signal turns on the first transistor Q1, the third scan signal turns on the third transistor Q3, and the second scan signal does not turn on the second transistor Q2. The data signal is transmitted to the first transistor circuit 612 and the third transistor circuit 616 through a signal transmission path 710. The pixel unit 610 performs the image display operation to display image data according to the data signal and the first common electrode signal.

In FIG. 16, when the pixel unit 610 is operated in the sensing mode, the first scan signal does not turn on the first transistor Q1, the third scan signal does not turn on the third transistor Q3, and the second scan signal turns on the second transistor Q2. The sensing circuit 620 charges/discharges the first terminal of the touch capacitor device Ctc through the sensing line DL2 to generate the relaxation signal S of FIG. 6. The relaxation signal S is transmitted through a signal transmission path 720. In the embodiment, the relaxation frequency of the relaxation signal S of each of the pixel units 610 is determined according to the resistance of the resistor device R and/or the parasitic resistance therein. Moreover, the pulse difference of the relaxation signal S is changed by the touch object 200. When the touch object 200 touches the pixel unit 610, the touch object 200 and the pixel unit 610 form the sensing capacitor device Cf. The touch position of the touch object 200 on the electronic paper display panel 600 may be determined according to the pulse difference of the relaxation signal of each of the pixel units 610. In an embodiment, the relaxation frequency may also be determined according to a parasitic resistance and a parasitic capacitance of the pixel unit, the first voltage, the second voltage, and a parasitic resistance of a tracing of the transistor circuit. Moreover, enough instructions, recommendations and implementations for the touch sensing operation of the embodiment may be learned from related descriptions of the embodiments of FIG. 1 to FIG. 13, and details thereof are not repeated.

In the embodiment of FIG. 9, the electronic paper display panel 400 takes the single pixel unit 410 as a basic unit for sensing the touch object 200, though the invention is not limited thereto. In an embodiment, the pixel units may also be properly grouped, and the pixel units of the same group may be taken as the basic unit for sensing the touch object 200.

Figure 17:
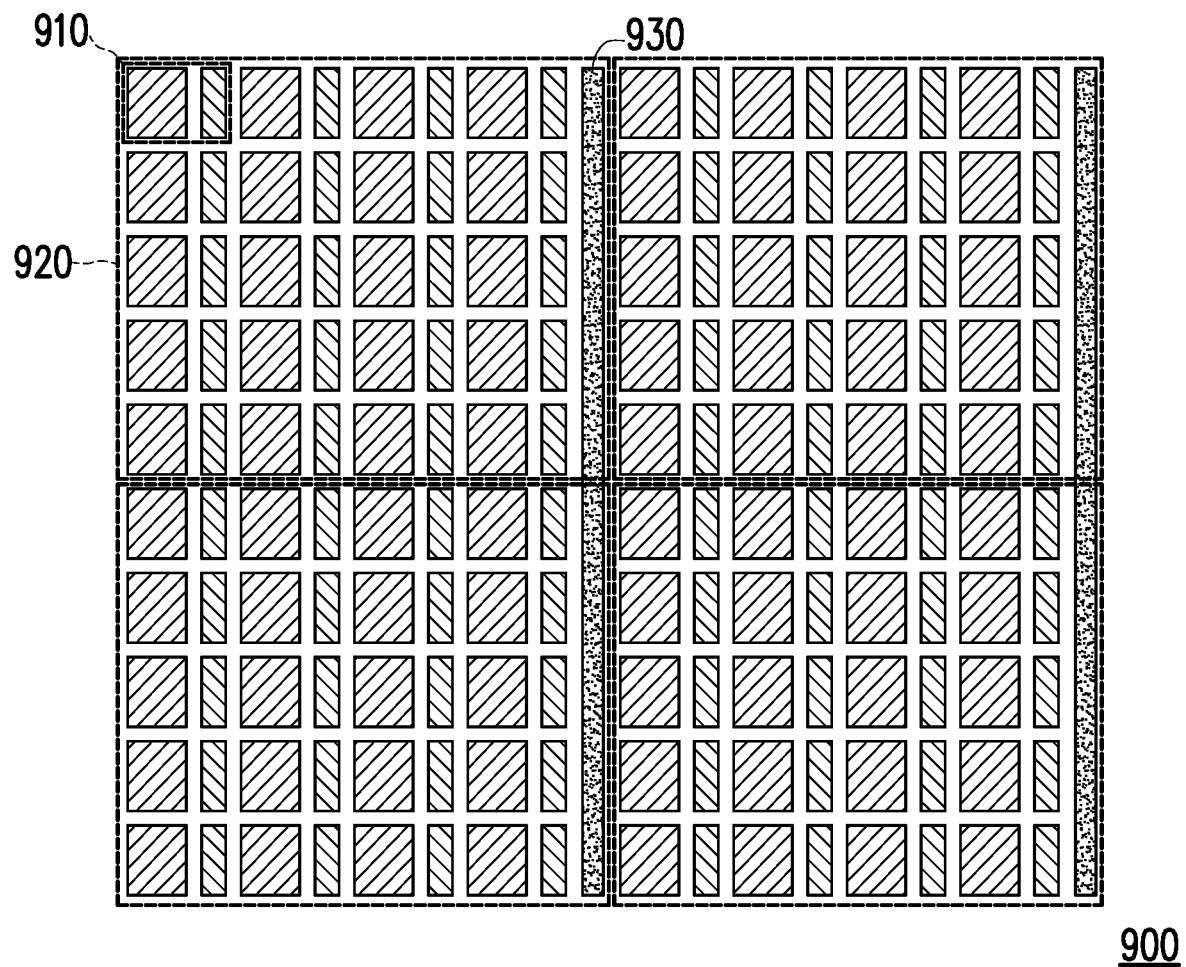
FIG. 17 is a structural schematic diagram of an electronic paper display panel according to another embodiment of the invention.

FIG. 17 is a structural schematic diagram of an electronic paper display panel according to another embodiment of the invention. The electronic paper display panel 900 of the embodiment is similar to the electronic paper display panel 400 of the embodiment of FIG. 9, and a main difference there between is that the pixel units 910 of the electronic paper display panel 900 are divided into one or a plurality of pixel unit groups 920, for example, 4 pixel unit groups. To be specific, in the embodiment, each of the pixel unit groups 920 is electrically connected to the corresponding sensing circuit. For example, the pixel unit groups 920 of the same column are electrically connected to a same sensing circuit. Moreover, the pixel units 910 in each of the pixel unit groups 920, for example, share the same sensing circuit. Moreover, enough instructions, recommendations and implementations for the touch sensing operation of the embodiment may be learned from related descriptions of the embodiments of FIG. 1 to FIG. 16, and details thereof are not repeated.

In the embodiment of FIG. 17, in view of a layout structure of the electronic paper display panel 900, multiple columns of the pixel units 910 correspond to one common electrode 930, and the common electrode 930 is disposed between the groups of the pixel unit groups, though the invention is not limited thereto. In an embodiment, the common column may also be disposed between the columns of the pixel units.

Figure 18:
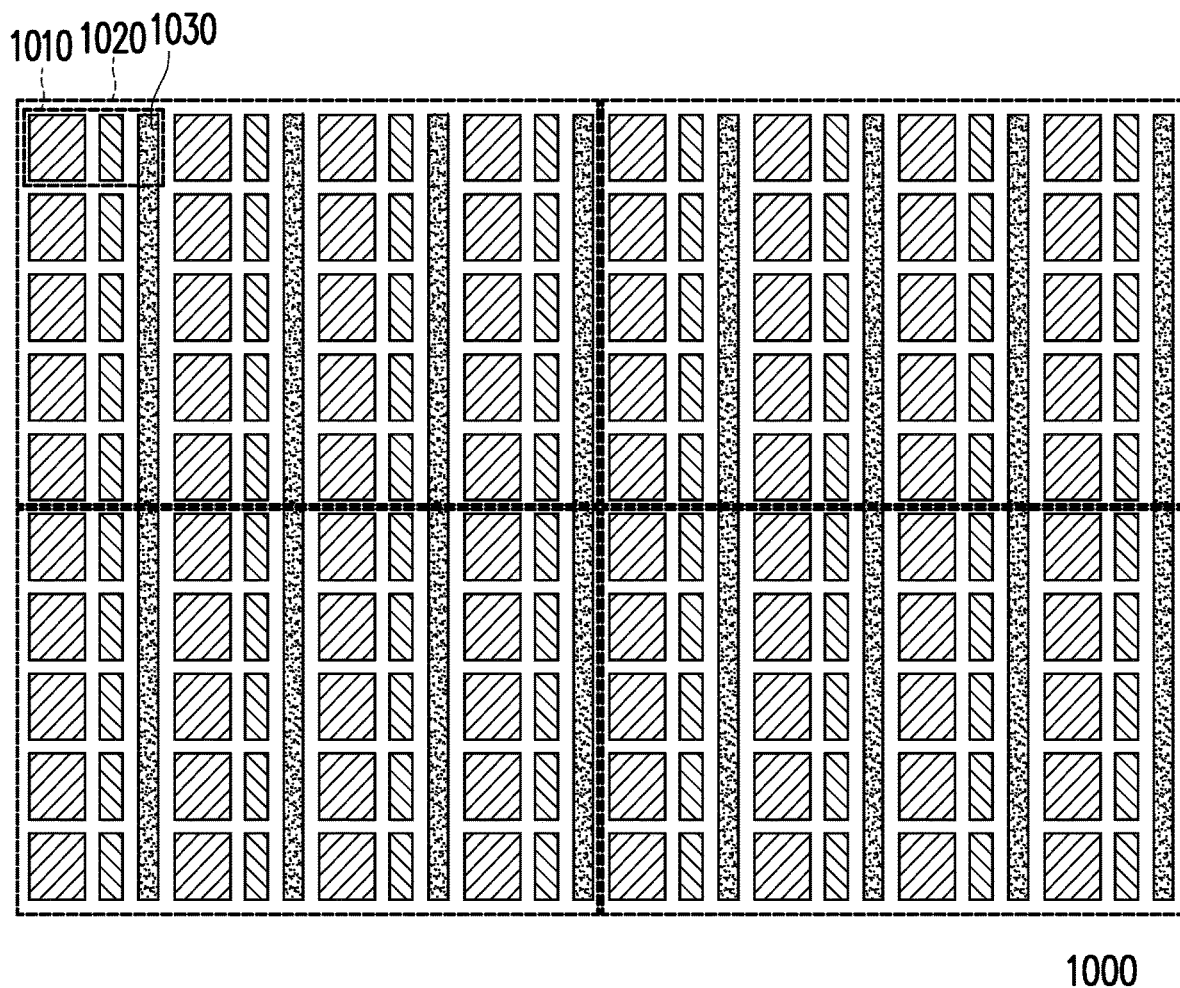
FIG. 18 is a structural schematic diagram of an electronic paper display panel according to another embodiment of the invention.

FIG. 18 is a structural schematic diagram of an electronic paper display panel according to another embodiment of the invention. The electronic paper display panel 1000 of the embodiment is similar to the electronic paper display panel 900 of the embodiment of FIG. 17, and a main difference there between is that the common electrode 1030 is disposed between the columns of the pixel units 610. In the embodiment, the pixel units 1010 on the electronic paper display panel 1000 of the embodiment are divided into one or a plurality of pixel unit groups 1020, for example, 4 pixel unit groups. Each of the pixel unit groups 1020 is electrically connected to the corresponding sensing circuit. For example, the pixel unit groups 1020 of the same column are electrically connected to a same sensing circuit. Moreover, the pixel units 1010 in each of the pixel unit groups 1020, for example, share the same sensing circuit. Moreover, enough instructions, recommendations and implementations for the touch sensing operation of the embodiment may be learned from related descriptions of the embodiments of FIG. 1 to FIG. 17, and details thereof are not repeated.

Figure 19:
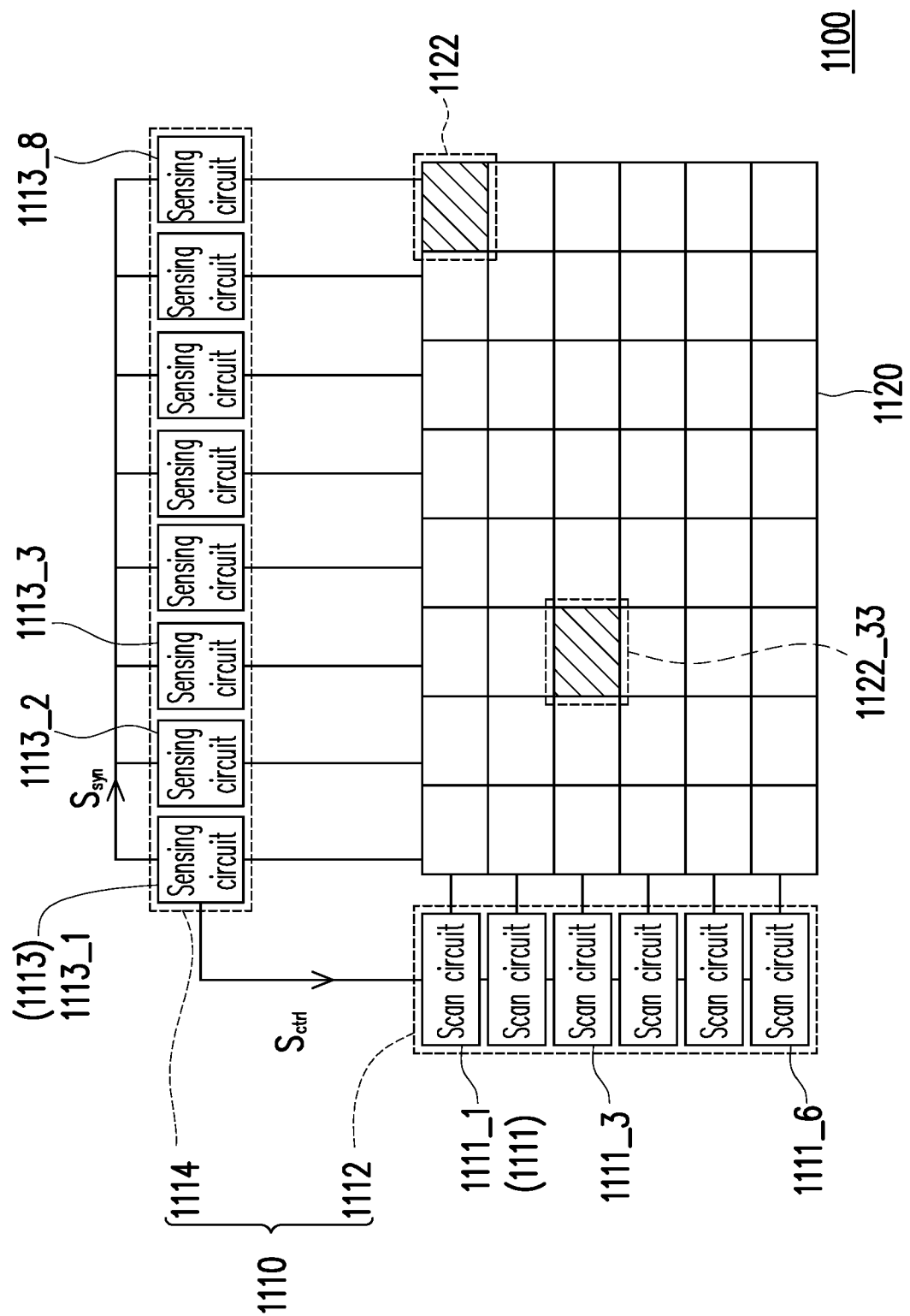
FIG. 19 is a schematic diagram of an electronic paper display apparatus according to another embodiment of the invention.

FIG. 19 is a schematic diagram of an electronic paper display apparatus according to another embodiment of the invention. Referring to FIG. 19, the electronic paper display apparatus 1100 of the embodiment has the touch sensing function. In the embodiment, the electronic paper display apparatus 1100 includes a driver apparatus 1110 and an electronic paper display panel 1120. The driver apparatus 1110 is electrically connected to the electronic paper display panel 1120. The driver apparatus 1110 is used for driving the electronic paper display panel 1120 to display image frames, and perform the touch sensing operation. A layout method of the electrodes of the electronic paper display panel 1120 is, for example, as that shown in FIG. 17 or FIG. 18, which is not limited by the invention.

To be specific, in the embodiment, the driver apparatus 1110 includes a scanner apparatus 1112 and a sensing apparatus 1114. The scanner apparatus 1112 is used for scanning a plurality of sensing blocks 1122 on the electronic paper display panel 1120 to perform the touch sensing operation. The sensing apparatus 1114 is used for controlling the scanner apparatus 1112 to scan the sensing blocks 1122, and charges/discharges each of the sensing blocks 1122 to generate the relaxation signal S of FIG. 6. In the embodiment, the sensing blocks 1122 are arranged in an array, and include a plurality of columns and a plurality of rows. Each of the sensing blocks 1122 includes one or a plurality of the sensing device 110 of FIG. 2. For example, a resolution of the electronic paper display panel 1120 is, for example, 320×240, and in an embodiment, every 40 columns or rows construct one unit, and based on such unit, the electronic paper display panel 1120, for example, includes 8 sensing channels and 6 scan channels. Therefore, the electronic paper display panel 1120 includes 48 sensing blocks 1122. It should be noted that the resolution of the electronic paper display panel 1120 and the numbers of the sensing channels, the scan channels and the sensing blocks are only an example, and the invention is not limited thereto.

In the invention, in the driver apparatus 1110 used for driving the electronic paper display panel 1120, the scanner apparatus 1112 includes a plurality of scan circuits 1111, and the sensing apparatus 1114 includes a plurality of sensing circuits 1113. The scan circuits 1111 are respectively and electrically connected to the sensing blocks 1122 of different rows. The scan circuits 1111, for example, turn on the respectively connected sensing blocks 1122 during the sensing period GT of FIG. 6 to perform the touch sensing operation. For example, in the embodiment, one of the sensing circuits 1113_1-1113_8 (for example, the sensing circuit 1113_1) outputs a control signal Sctrl to control the scan circuits 1111_1-1111_6 based on rows to sequentially scan the sensing blocks 1122 of different rows on the electronic paper display panel 1120.

In the embodiment, the sensing circuits 1113 respectively and simultaneously charge/discharge the sensing blocks 1122 of different columns to generate the relaxation signal S. For example, when the sensing blocks 1122 of each row are sequentially turned on, one of the sensing circuits (for example, the sensing circuit 1113_1) outputs a synchronization signal Ssyn to synchronize the other sensing circuits 1113_2-1113_8 to respectively and simultaneously charge/discharge the sensing blocks 1122 of different columns during the sensing period GT, so as to obtain the relaxation signal S of the sensing blocks 1122 of different columns.

Therefore, according to such scan sensing method, the touch position of the touch object on the electronic paper display panel 1120 may be determined. For example, when the sensing block 1122_33 is touched, a horizontal coordinate position (a first orientation) of the touch object on the electronic paper display panel 1120 may be determined according to a position of the sensing circuit 1113_3 (located at a third column), and a vertical coordinate position (a second orientation) of the touch object on the electronic paper display panel 1120 may be determined according to a position of the scan circuit 1111_3 (located at a third row). In the embodiment, the electronic paper display panel 1120 may implement a single-point or multi-point touch sensing operation, and enough instructions, recommendations and implementations for the operation method thereof may be learned from ordinary knowledge of the field, and details thereof are not repeated.

Therefore, in the embodiment, the sensing apparatus 1114, for example, charges/discharges each of the sensing blocks 1122 according to the first voltage V1 and the second voltage V2 of FIG. 6 to generate the relaxation signal S. The pulse difference of the relaxation signal S is changed by the touch object. The touch position of the touch object on the electronic paper display panel 1120 is determined according to the pulse difference of the relaxation signal S of each of the sensing blocks 1122. Moreover, enough instructions, recommendations and implementations for the touch sensing operation of the embodiment may be learned from related descriptions of the embodiments of FIG. 1 to FIG. 8, and details thereof are not repeated.

In the embodiment, the circuit structure of the electronic paper display panel 1120 is, for example, as that shown in FIG. 10, which is a circuit structure where the two transistors share the data line to transmit the relaxation signal. Alternatively, the circuit structure of the electronic paper display panel 1120 is, for example, as that shown in FIG. 13, which is a circuit structure where the two transistors do not share the data line to transmit the relaxation signal. Alternatively, the circuit structure of the electronic paper display panel 1120 is, for example, as that shown in FIG. 14, which is a circuit structure where the three transistors share the data line to transmit the relaxation signal, or other similar circuit structure. The circuit structure of the electronic paper display panel 1120 is not limited by the invention.

In the embodiment, a circuit structure of the sensing circuit 1113 may be the same or similar with that of the sensing circuit 120 of FIG. 4. The circuit structure of the sensing circuit 1113 is not limited by the invention. In the embodiment, the sensing circuit 1113, for example, includes a counter circuit (not shown). The counter circuit is used for setting the sensing period GT to receive the relaxation signal S. The counter circuit counts a pulse number of the relaxation signal S during the sensing period. In the embodiment, the counter circuit is, for example, an external circuit different to the sensing circuit 113, or a counter circuit configured in internal of the sensing circuit 1113.

In an embodiment, each of the sensing circuits 1113 may be implemented by a single microcontroller or other similar device, for example, a field-programmable gate array (FPGA). The microcontroller, for example, includes a function of a relaxation oscillator, a function of the counter circuit, etc. The microcontroller further outputs the control signal Sctrl and the synchronization signal Ssyn to respectively control the scan operation of the scan circuits 1111 and synchronize the sensing operations of the other sensing circuits 1113.

In the embodiment, enough instructions, recommendations and implementations for the circuit structure and the implementation of the scan circuits 1111 may be learned from ordinary knowledge of the field, and details thereof are not repeated.

Figure 20:
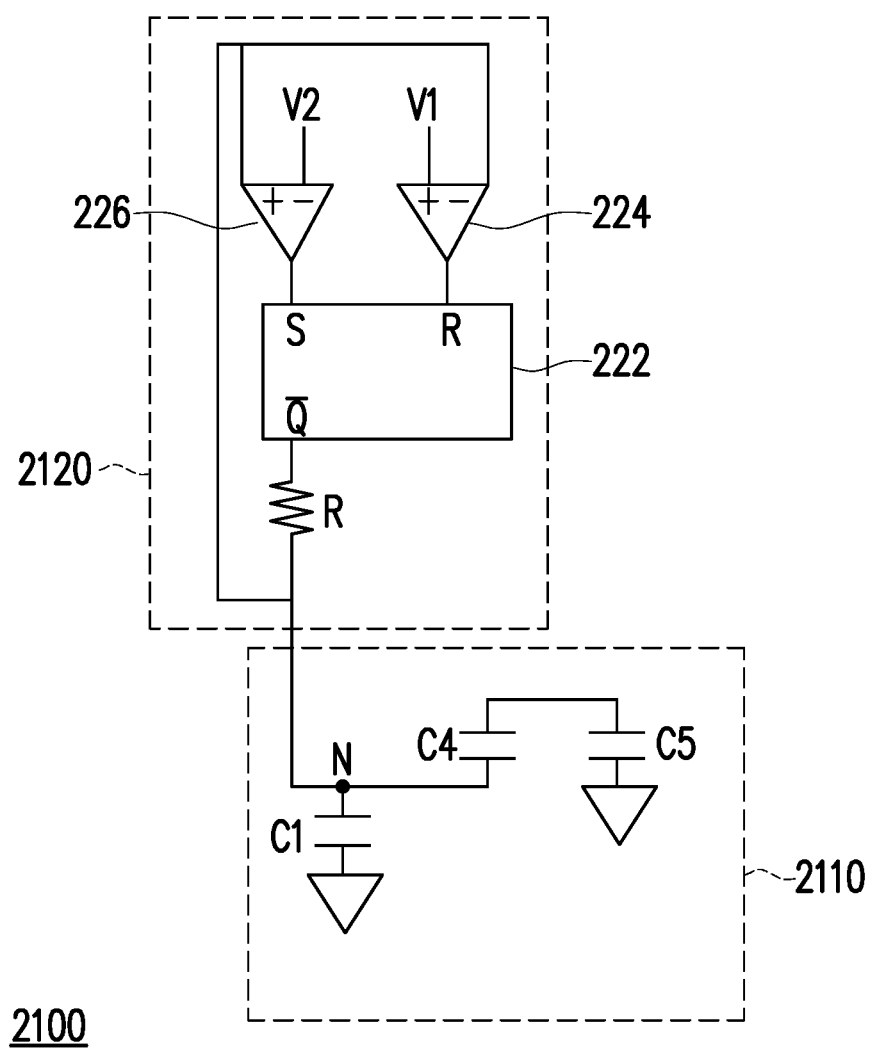
FIG. 20 is an equivalent circuit schematic diagram of a touch sensor operated in any frequency within an operation frequency interval according to another embodiment of the invention.

FIG. 20 is an equivalent circuit schematic diagram of a touch sensor operated in any frequency within an operation frequency interval according to another embodiment of the invention. Referring to FIG. 4 and FIG. 20, the touch sensor 2100 of the embodiment is similar to the touch sensor 100 of the embodiment of FIG. 4, and a main difference there between lies in a circuit structure of a sensing circuit 2120. In the embodiment, a sensing block 2110, for example, includes one or a plurality of the sensing devices 110 shown in FIG. 2, so that a schematic diagram of an equivalent capacitance thereof is similar as that shown in FIG. 4.

To be specific, in the embodiment, the sensing circuit 2120 includes a resistor device R, a latch circuit 222, a first comparator circuit 224 and a second comparator circuit 226. The resistor device R has a first terminal and a second terminal. The second terminal of the resistor device R is coupled to the sensing block 2110. The latch circuit 222 has a first input terminal, a second input terminal and an output terminal. The output terminal of the latch circuit 222 is coupled to the first terminal of the resistor device R. In an embodiment, the latch circuit 222, for example, includes a RS latch, and the first input terminal, the second input terminal and the output terminal thereof are respectively a reset terminal, a setting terminal and a $\overline{Q}$ terminal of a RS flip-flop. The first comparator circuit 224 has a first input terminal, a second input terminal and an output terminal. The first input terminal of the first comparator circuit 224 is coupled to the second terminal of the resistor device R and the sensing block 2210. The second input terminal of the first comparator circuit 224 receives the first voltage V1. The output terminal of the first comparator circuit 224 is coupled to the first input terminal of the latch circuit 222. The second comparator circuit 226 has a first input terminal, a second input terminal and an output terminal. The first input terminal of the second comparator circuit 226 receives the second voltage V2. The second input terminal of the second comparator circuit 226 is coupled to the second terminal of the resistor device R and the sensing block 2210. The output terminal of the second comparator circuit 226 is coupled to the second input terminal of the latch circuit 222.

Referring to FIG. 6 and FIG. 20, in the embodiment, when the touch object 200 touches the sensing block 2110, if a voltage of a node N is smaller than the first voltage V1, the second voltage V2 charges the first capacitor device C1 until the voltage of the node N is greater than the second voltage V2. When the voltage of the node N is greater than the second voltage V2, the first capacitor device C1 discharges toward the first voltage V1 until the voltage of the node N is smaller than the first voltage V1. Repeatedly, the relaxation signal S is produced at the node N, as shown in FIG. 6. When the touch object 200 touches the sensing block 2110, the fourth capacitor device C4 and the fifth capacitor device C5 exist. In this case, since an equivalent capacitance of the node N to the ground terminal has been changed, the pulse difference of the relaxation signal S is changed (for example, decreased) by the touch object 200. During the sensing period GT, the pulse number of the relaxation signal S is decreased. Therefore, in the embodiment, one of the methods for determining whether the relaxation frequency is changed is to, for example, determine whether the pulse number of the relaxation signal S is changed during the sensing period GT. In other words, in the embodiment, the pulse difference of the relaxation signal S is changed by the touch object. Whether the touch object 200 touches the sensing block 2110 is, for example, determined according to the pulse difference of the relaxation signal S.

Enough instructions, recommendations and implementations for the touch sensing operation of the embodiment may be learned from related descriptions of the embodiments of FIG. 1 to FIG. 6, and details thereof are not repeated. Moreover, in the embodiment of FIG. 19, the circuit structure of the sensing circuit 1113 is, for example, the same or similar to the sensing circuit 2120 of FIG. 20. The circuit structure of the sensing circuit 1113 is not limited by the invention.

Figure 21:
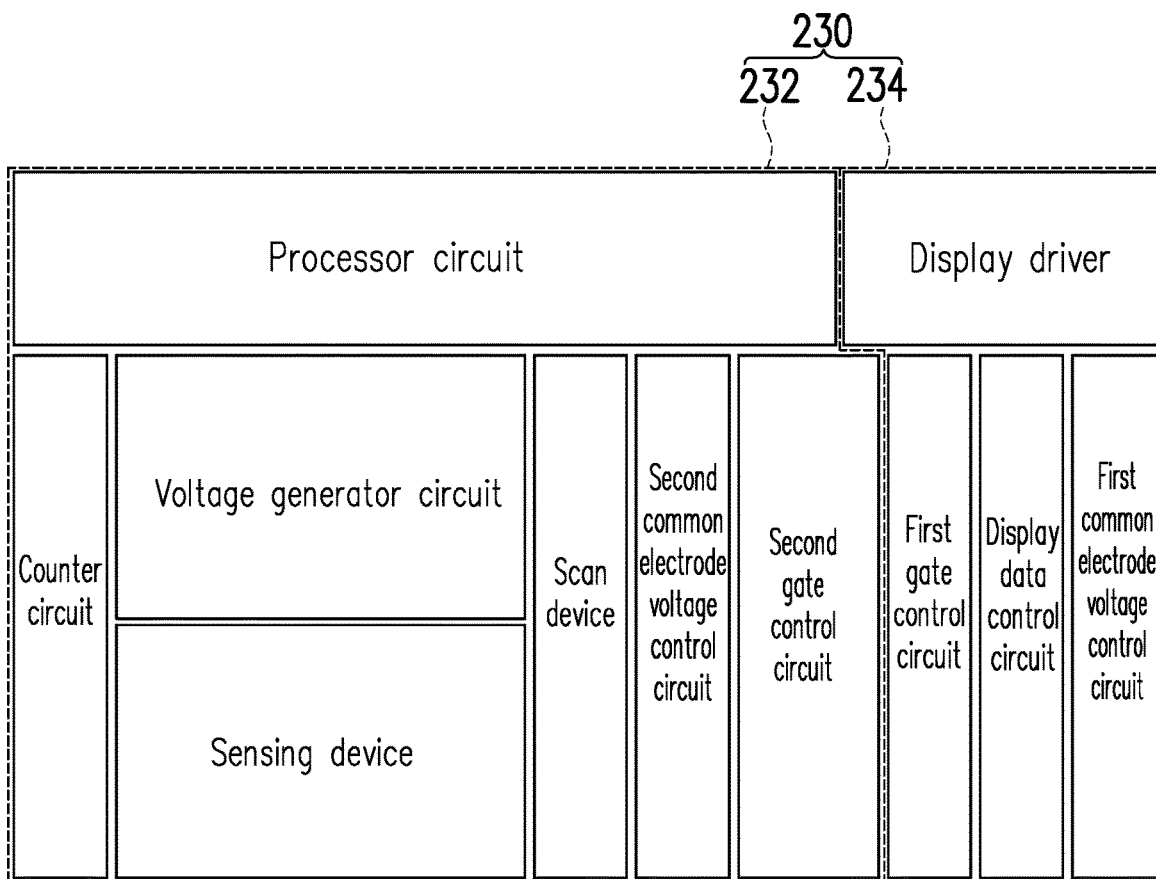
FIG. 21 is a schematic diagram of a driver apparatus according to an embodiment of the invention.

FIG. 21 is a schematic diagram of a driver apparatus according to an embodiment of the invention. Referring to FIG. 21, the driver apparatus 230 of the embodiment is, for example, an integrated chip. The driver apparatus 230 includes a touch driving block 232 and a display driving block 234. The display driving block 234 is electrically connected to the touch driving block 232. In the embodiment, the scanner apparatus and the sensing apparatus are disposed in the touch driving block 232.

To be specific, in the embodiment, the display driving block 234 includes a display driver, a first common electrode voltage control circuit, a first gate control circuit and a display data control circuit. The first common electrode voltage control circuit is, for example, coupled to the first common electrode lines CL1 of FIG. 10, FIG. 13 or FIG. 14, and is used for controlling supplying of the first common electrode signals. The first gate control circuit is, for example, coupled to the first scan lines SL1 of FIG. 10, FIG. 13 or FIG. 14, and is used for controlling a conduction state of the first transistor Q1 according to the first scan signal. The display data control circuit is, for example, coupled to the data line DL1 of FIG. 10 or FIG. 13, or the data line DL1 of FIG. 14. The display data control circuit is used for controlling the data signal written to the first transistor Q1 or the third transistor Q3. Therefore, the pixel unit performs the image display operation to display image data according to the data signal. The display driver is used for driving and controlling the electronic paper display panel to perform the image display operation. The display driver includes various circuit devices required for driving the electronic paper display panel.

In the embodiment, the touch driving block 232 includes a scanner apparatus, a sensing apparatus, a processor circuit, a counter circuit, a voltage generator circuit, a second common electrode voltage control circuit and a second gate control circuit (pixel control circuit). One of the implementations of the scanner apparatus and the sensing apparatus is as that shown in FIG. 19, which is not limited by the invention. The scanner apparatus is, for example, coupled to the second scan lines SL2 of FIG. 10, FIG. 13 or FIG. 14. The sensing apparatus is, for example, coupled to the data lines DL1 of FIG. 10 and the sensing lines DL2 of FIG. 13.

In the embodiment, the voltage generator circuit, for example, includes one or a plurality of programmable voltage sources, and is used for generating the first voltage V1 and the second voltage V2. The counter circuit is used for setting the sensing period GT, and counts the pulse number of the relaxation signal S of the node N. In an embodiment, the counter circuit may include two counters to execute the above two operation steps. For example, one of the counters is used for counting the pulse number of the relaxation signal S, and another counter is used for setting the sensing period GT. The second common electrode voltage control circuit is, for example, coupled to the second common electrode lines CL2 of FIG. 10, FIG. 13 or FIG. 14, and is used for controlling supplying of the second common electrode signals. The second gate control circuit is, for example, coupled to the third scan lines SL3 of FIG. 14, and is used for controlling a conduction state of the third transistor Q3 according to the third scan signal. In an embodiment, the second gate control circuit is selectively configured. For example, when the driver apparatus 230 is used for driving the electronic paper display panels 400, 800 of FIG. 10 and FIG. 13, since the circuit structures of the electronic paper display panels 400, 800 do not include the third transistor Q3, in this case, the driver apparatus 230 is not configured with the second gate control circuit. In the embodiment, the processor circuit is, for example, used for receiving a sensing result of the sensing apparatus, and calculates a touch position of the touch object on the electronic paper display panel according to the relaxation signal S of the sensing block. Enough instructions, recommendations and implementations for the touch sensing operation of the embodiment may be learned from related descriptions of the embodiments of FIG. 1 to FIG. 20, and details thereof are not repeated.

In the embodiment, designs of the display driver, the first common electrode voltage control circuit, the first gate control circuit, the display data control circuit, the processor circuit, the voltage generator circuit, the second common electrode voltage control circuit and the second gate control circuit are adjusted along with different electronic paper display panels, and are implemented by proper circuit structures of the technical field, which are not limited by the invention.

In the embodiment, the devices or circuits included in each of the blocks in the integrated chip are only an example, and are not intended to be limiting of the invention, and may be adaptively adjusted by a designer according to an actual requirement.

Figure 22:
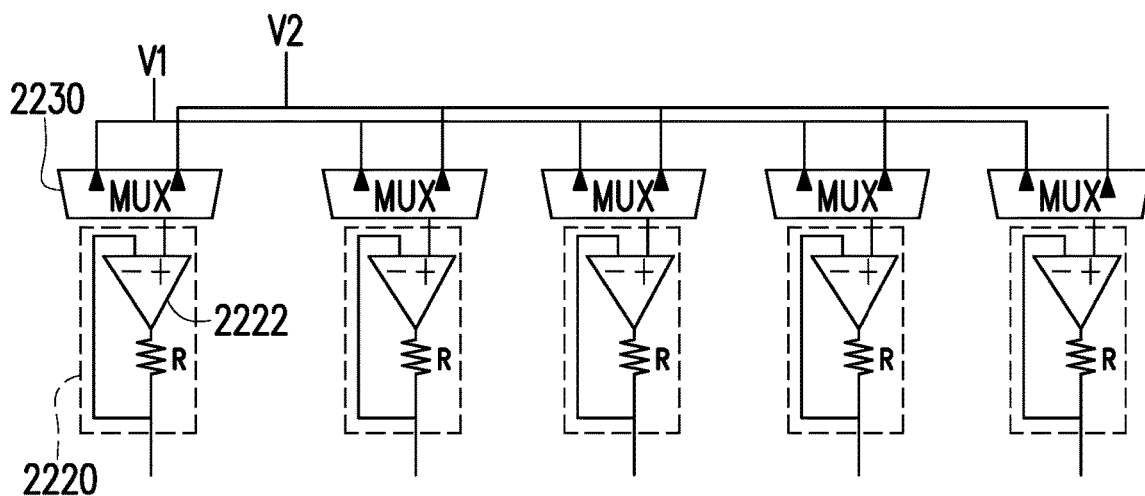
FIG. 22 is a schematic diagram of a sensing apparatus of the embodiment of FIG. 21.

FIG. 22 is a schematic diagram of a sensing apparatus of the embodiment of FIG. 21. Referring to FIG. 21 and FIG. 22, the sensing apparatus 2214 of the embodiment includes a plurality of sensing circuits 2220 and a plurality of selector circuits 2230. The sensing circuits 2220 are connected to corresponding sensing channels. The selector circuits 2230 are used for synchronously selecting the first voltage V1 or the second voltage V2, and transmitting the selected voltage to amplifier circuits 2222. Therefore, the voltage received by the amplifier circuits 2222 may be switched between the first voltage V1 and the second voltage V2. Enough instructions, recommendations and implementations for the operation of the sensing apparatus 2214 may be learned from related description of the embodiment of FIG. 19, and details thereof are not repeated.

In summary, in the embodiments of the invention, the driver apparatus of the electronic paper display panel is used for scanning the sensing blocks, and charging/discharging the sensing blocks of different columns to perform the touch sensing operation. The driver apparatus includes a plurality of sensing circuits or a plurality of microprocessors to perform the touch sensing operation. The driver apparatus may be integrated into an integrated chip to drive the electronic paper display panel to perform the touch sensing operation. In the embodiments of the invention, the sensing block includes one or a plurality of touch sensors. The touch sensor includes a shielding layer. Existence of the shielding layer does not influence the touch sensing operation of the touch sensor. Whether the touch object touches the touch sensor may be determined according to the pulse difference of the relaxation signal. Moreover, the electronic paper display panel and the electronic paper display apparatus including the touch sensor may provide the touch sensing function. The touch position of the touch object on the touch sensing panel may be determined according to whether the pulse difference of the relaxation signal of each touch sensor is changed.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A driver apparatus, driving an electronic paper display panel to perform a touch sensing operation, the driver apparatus comprising:
   a scanner apparatus, scanning a plurality of sensing blocks on the electronic paper display panel to perform the touch sensing operation, wherein each of the sensing blocks comprises one or a plurality of sensing devices, and the sensing blocks are arranged in an array; and
   a sensing apparatus, electrically connected to the scanner apparatus, and controlling the scanner apparatus to scan the sensing blocks, wherein the sensing apparatus charges/discharges each of the sensing blocks according to a first voltage and a second voltage, so as to generate a relaxation signal, a pulse difference of the relaxation signal is changed by a touch object, and the touch object is a conductor,
   wherein a touch position of the touch object on the electronic paper display panel is determined according to a relaxation frequency of the relaxation signal of each of the sensing blocks.

2. The driver apparatus as claimed in claim 1, wherein the sensing apparatus comprises a plurality of sensing circuits, and the sensing circuits respectively charge/discharge the sensing blocks of different columns to generate the relaxation signal.

3. The driver apparatus as claimed in claim 2, wherein one of the sensing circuits outputs a control signal to control the scanner apparatus to scan the sensing blocks.

4. The driver apparatus as claimed in claim 2, wherein one of the sensing circuits outputs a synchronization signal to synchronize the other sensing circuits, so as to respectively charge/discharge the sensing blocks of different columns during a sensing period to generate the relaxation signal.

5. The driver apparatus as claimed in claim 2, wherein each of the sensing circuits comprises:
 a resistor device, having a first terminal and a second terminal, and the second terminal of the resistor device being coupled to the sensing blocks; and
 an amplifier circuit, having a first input terminal, a second input terminal and an output terminal, wherein the first input terminal receives a reference voltage, the second input terminal is coupled to the second terminal of the resistor device and the sensing blocks, and the output terminal is coupled to the first terminal of the resistor device,
 wherein the reference voltage is switched between the first voltage and the second voltage.

6. The driver apparatus as claimed in claim 2, wherein each of the sensing circuits comprising:
 a resistor device, having a first terminal and a second terminal, and the second terminal of the resistor device being coupled to the sensing blocks;
 a latch circuit, having a first input terminal, a second input terminal and an output terminal, and the output terminal of the latch circuit being coupled to the first terminal of the resistor device;
 a first comparator circuit, having a first input terminal, a second input terminal and an output terminal, wherein the first input terminal is coupled to the second terminal of the resistor device and the sensing blocks, the second input terminal receives the first voltage, and the output terminal is coupled to the first input terminal of the latch circuit; and
 a second comparator circuit, having a first input terminal, a second input terminal and an output terminal, wherein the first input terminal receives the second voltage, the second input terminal is coupled to the second terminal of the resistor device and the sensing blocks, and the output terminal is coupled to the second input terminal of the latch circuit.

7. The driver apparatus as claimed in claim 2, wherein each of the sensing circuits is a microcontroller unit (MCU).

8. The driver apparatus as claimed in claim 1, wherein the scanner apparatus sequentially scans the sensing blocks of different rows on the electronic paper display panel based on rows.

9. The driver apparatus as claimed in claim 8, wherein the scanner apparatus comprises a plurality of scan circuits, and the scan circuits are respectively and electrically connected to the sensing blocks of different rows, and turn on the respectively connected sensing blocks during a sensing period, so as to perform the touch sensing operation.

10. The driver apparatus as claimed in claim 1, wherein the touch position of the touch object on the electronic paper display panel comprises a first orientation and a second orientation, the first orientation is determined according to positions of a plurality of sensing circuits in the sensing apparatus, and the second orientation is determined according to positions of a plurality of scan circuits in the scanner apparatus.

11. The driver apparatus as claimed in claim 1, wherein the scanner apparatus and the sensing apparatus are integrated in an integrated chip.

12. The driver apparatus as claimed in claim 11, wherein the integrated chip comprises:
 a touch driving block, driving the electronic paper display panel to perform the touch sensing operation, wherein the scanner apparatus and the sensing apparatus are disposed in the touch driving block; and
 a display driving block, electrically connected to the touch driving block, and driving the electronic paper display panel to perform an image display operation.

13. The driver apparatus as claimed in claim 12, wherein the touch driving block comprises a voltage generation circuit electrically connected to the sensing apparatus and generating the first voltage and the second voltage.

14. The driver apparatus as claimed in claim 12, wherein the electronic paper display panel includes a plurality of pixel units operated in a display mode or a sensing mode, and the touch driving block comprises a pixel control circuit electrically connected to the sensing apparatus, and in the display mode, the pixel control circuit controls to turn on a transistor in each of the pixel units, and in the sensing mode, the pixel control circuit controls not to turn on the transistor in each of the pixel units.

15. The driver apparatus as claimed in claim 1, wherein the electronic paper display panel is one of a segmented electronic paper display panel and a thin film transistor electronic paper display panel.

16. The driver apparatus as claimed in claim 1, wherein the electronic paper display panel comprises a conductive shielding layer.

* * * * *